(12) United States Patent
Murray

(10) Patent No.: US 11,677,553 B2
(45) Date of Patent: Jun. 13, 2023

(54) MANAGING ENCRYPTED STORAGE BASED ON KEY-METADATA

(71) Applicant: Zettaset, Inc., Mountain View, CA (US)

(72) Inventor: Eric A. Murray, Los Gatos, CA (US)

(73) Assignee: ZETTASET, INC., Mountain View, CA (US)

(*) Notice: Subject to any disclaimer, the term of this patent is extended or adjusted under 35 U.S.C. 154(b) by 289 days.

(21) Appl. No.: 17/174,669

(22) Filed: Feb. 12, 2021

(65) Prior Publication Data

US 2022/0263655 A1 Aug. 18, 2022

(51) Int. Cl.
| | |
|---|---|
| *H04L 9/08* | (2006.01) |
| *H04L 9/40* | (2022.01) |
| *H04L 9/32* | (2006.01) |
| *G06F 9/451* | (2018.01) |

(52) U.S. Cl.
CPC ............ *H04L 9/0894* (2013.01); *G06F 9/451* (2018.02); *H04L 9/0891* (2013.01); *H04L 9/3268* (2013.01); *H04L 63/083* (2013.01); *H04L 63/166* (2013.01)

(58) Field of Classification Search
CPC .................................................... H04L 9/0894
See application file for complete search history.

(56) References Cited

U.S. PATENT DOCUMENTS

| | | | |
|---|---|---|---|
| 8,712,044 B2* | 4/2014 | MacMillan | H04L 9/3239 380/278 |
| 10,284,534 B1* | 5/2019 | Perlman | H04L 63/061 |
| 2008/0165973 A1* | 7/2008 | Miranda Gavillan | G06F 21/6209 380/278 |
| 2011/0314275 A1 | 12/2011 | Gopshtein et al. | |
| 2012/0131354 A1 | 5/2012 | French | |
| 2013/0044882 A1* | 2/2013 | Rich | H04L 9/0833 380/279 |
| 2014/0334611 A1 | 11/2014 | Barnes et al. | |
| 2017/0093587 A1 | 3/2017 | Glisson | |
| 2020/0177637 A1 | 6/2020 | Narayanaswamy et al. | |
| 2020/0358751 A1 | 11/2020 | Bansal et al. | |

* cited by examiner

*Primary Examiner* — Bradley W Holder
(74) *Attorney, Agent, or Firm* — Asif Ghias

(57) ABSTRACT

Techniques are disclosed for managing encrypted storage resources based on key-metadata. The per-key key-metadata is stored in a key management system/server (KMS) along with respective cryptographic keys. The cryptographic keys in the KMS may be data keys or wrapping keys for the data keys. The management of the storage resources is provided via a central console which is a user interface of a console server in authenticated communication with the KMS. The key-metadata associates cryptographic keys to their respective encrypted storage resources. This association is used by the console server to drive the console. The console allows an admin to view/list all encrypted storage resources and related cryptographic objects including keys and digital certificates, as well as to perform various administrative/management functions on them.

18 Claims, 12 Drawing Sheets

Console Server 306A

_Tabs: Tenants, Key Servers, Hosts, Keys Administration, Account_

402

| Name | Key ID | Server ID | Product | Deployment | Host | Object ID |
|---|---|---|---|---|---|---|
| ☐ undefined | 84b00973-db0-418d-b59b-67eac4db07a | 990af409-6455-42ec-9346-2d1f5e6af26e | XCrypt Full Disk | Deployment-xfd | database-2 | /dev/sdc3 |
| ☐ undefined | d4bd5956-85c1-4d2b-85ed-a48b689cc441 | 990af409-6455-42ec-9346-2d1f5e6af26e | XCrypt Docker | Deployment-docker | webserver-4 | docker-volume-5 |
| ☐ undefined | ecd125d8-d0ae-4539-9293-f97675db4b90 | 990af409-6455-42ec-9346-2d1f5e6af26e | XCrypt K8s | Deployment-k8s-OpenShift | k8s-worker-node-6 | k8s-pv-pvc-7 |
| ☐ undefined | 7d2570c2-7fc3-4b04-8bce-2fc455c66b2b | 41225cf3-1164-4db1-839a-87afc3316b4e | XCrypt Full Disk | Deployment-xfd | database-8 | /dev/sdc9 |
| ☐ undefined | 5aa3fcec-e94f-40a7-a0b4-e2e4fa0c98e9 | 41225cf3-1164-4db1-839a-87afc3316b4e | XCrypt Docker | Deployment-docker | webserver-10 | docker-volume-11 |

Showing 1 to 5 of 27 entries

*Fig. 7A*

| Object ID | activation Date | expiration Date | Key State |
|---|---|---|---|
| /dev/sdc3 | 2020-11-03T05:00:00.000+0000 | 2120-11-03T04:00:00.000+0000 | ACTIVE |
| docker-volume-5 | 2020-11-03T05:00:00.000+0000 | 2120-11-03T04:00:00.000+0000 | ACTIVE |
| k8s-pv-pvc-7 | 2020-11-03T05:00:00.000+0000 | 2120-11-03T04:00:00.000+0000 | ACTIVE |
| /dev/sdc9 | 2020-11-03T05:00:00.000+0000 | 2120-11-03T04:00:00.000+0000 | ACTIVE |
| docker-volume-11 | 2020-11-03T05:00:00.000+0000 | 2120-11-03T04:00:00.000+0000 | ACTIVE |

404

Show 5 entries

Search:

Previous 1 2 3 4 5 6 Next

*Fig. 7B*

Console Server 306A

Deployments  Key Servers  Hosts  Keys  Administration  Account

406

Show [ 5 ] entries

Search:

| ♦ | Host | Deployment | Product |
|---|---|---|---|
| ☐ | k8s-worker-node-24 | Deployment-k8s-OpenShift | XCrypt K8s |
| ☐ | k8s-worker-node-48 | Deployment-k8s-OpenShift | XCrypt K8s |
| ☐ | database-50 | Deployment-xfd | XCrypt Full Disk |
| ☐ | k8s-worker-node-42 | Deployment-k8s-OpenShift | XCrypt K8s |
| ☐ | database-2 | Deployment-xfd | XCrypt Full Disk |

Showing 1 to 5 of 27 entries

Previous  1  2  3  4  5  6  Next

*Fig. 8*

Console Server 306A

Deployments  Key Servers  Hosts  Keys  Administration ▾  Account ▾

408

Show [ 5 ▾ ] entries

Search:

| Deployment | Product |
|---|---|
| ☐ Deployment-xfd | XCrypt Full Disk |
| ☐ Deployment-docker | XCrypt Docker |
| ☐ Deployment-k8s-OpenShift | XCrypt K8s |

Showing 1 to 3 of 3 entries

Previous [ 1 ] Next

*Fig. 9*

| Console Server 306A | | Deployments  Key Servers  Hosts  Keys  Administration ▾  Account ▾ |
|---|---|---|
| 410 | | Show [5 ▾] entries  Search: [_____] |

| | Login | Role |
|---|---|---|
| ○ | system | ROOT |
| ○ | System1 | ADMIN |
| ○ | System2 | USER |
| ○ | System3 | ADMIN |
| ○ | System4 | USER |

Showing 1 to 5 of 6 entries

[Create User] [Edit] [Delete]

[Previous] [1] [2] [Next]

*Fig. 10*

| Console Server 306A | Deployments | Key Servers | Hosts |
|---|---|---|---|

412

Show 5 entries

Search:

| Name | IP Address | Port | CAFile Path | Keystore Path |
|---|---|---|---|---|
| KMIP222 | 0.0.0.56 | 2335 | /new | /new |
| KMIP1998 | 0.0.0.111 | 31150 | /CAFILE | /KEYSTORE |
| KMIP101 | 0.0.0.55 | 61234 | /CAFILE | /KEYSTORE |
| kmip20 | 15.15.15.15 | 8080 | /what | /what |
| krnip30 | 192.111.111.15 | 8087 | /CA | /KS |

Showing 1 to 5 of 9 entries   1 row selected

Create  Edit  Delete

Previous  1  2  Next

*Fig. 11*

MANAGING ENCRYPTED STORAGE BASED ON KEY-METADATA

FIELD OF THE INVENTION

This invention relates to managing encrypted storage resources based on metadata associated with cryptographic keys.

BACKGROUND ART

Data security is an active field of academic and industrial pursuit. With the news of data breaches a commonplace occurrence, it is unsurprising that many academic and professional pursuits are focused on it. Therefore, a number of techniques have been developed for securing data resources by encryption in a computer environment. These encrypted data resources need to be managed to ensure their continued protection against adversaries and attacks.

As the complexity of computer environments grow, so does the above task of managing such encrypted storage resources in a non-tedious, predictable and reliable manner. While there have been attempts at making this challenge tractable, they have missed the mark. Of such attempts, U.S. Patent Publication No. 2017/0093587 A1 to Glisson describes a certificate orchestration system for digital certificate and encryption key management. Their system includes a certificate orchestration server having a processing device in communication with a coupled storage system that is coupled to the certificate orchestration server. The system further includes an interface provided by the certificate orchestration server to a client device; and a database to store digital certificates and keys. The certificate orchestration server is configured to receive a request from the client device to generate a digital certificate and an associated public key. It is further configured to receive the digital certificate and associated public key from a third-party certificate authority system over an external network, store the digital certificate and public key in the coupled storage system. The coupled storage system is not directly connected to the client device.

U.S. Pat. No. 8,712,044 B2 to MacMillan et al. discloses embodiments directed towards enabling cryptographic key management without disrupting cryptographic operations. The embodiments may be employed to generate cryptographic keys based on at least one key parameter that may be provided by an administrator. The administrator may generate key managers and key request users that may be linked to particular cryptographic keys. The cryptographic keys may be stored on key exchange servers separate from the key management server. Responsive to a request for a cryptographic key, the key exchange servers may authenticate the key request user associated with the request. The key request may be validated based on at least one key parameter and a portion of the key request. The key exchange server may generate the requested cryptographic keys providing them to the key request user over the network.

U.S. Patent Publication No. 2008/0165973 A1 to Gavillan et al. teaches a method, system and program for the retrieval of key label codes enabling access to encrypted data in a storage cartridge. An external key manager (EKM) wraps the data key used to encrypt the data with one or more encryption keys to form one or more encryption encapsulated data keys (EEDKs). The EEDK(s), which comprise a key label referencing the EKM containing their respective decryption key, are then stored on the storage cartridge along with the encrypted data. A key label list is generated and updated by querying one or more EKMs to collect the key labels they support. Once the key labels are collected, the existing list is purged and replaced with the new list of collected key labels. A key label is selected from the updated list and its associated EEDK is routed to the EKM containing the decryption key required to extract the data key it contains, which is then used to encode the data on the tape cartridge.

U.S. Patent Publication No. 2020/0358751 A1 to Bansal et al. discloses extending key management protocol (KMIP) to provide an extended credential type that enables an initiating (first) client device to create a credential dynamically and that can then be selectively shared with and used by other (second) client devices. Using a dynamically-created credential of this type, the other (second) devices are able to fetch the same key configured by the initiating (first) device. In this manner, multiple devices are able to create and share one or more keys among themselves dynamically, and on as-needed basis without requiring a human administrator to create a credential for a device group in advance of its usage.

U.S. Patent Publication No. 2013/0044882 A1 to Rich et al. discloses a system of extending key management interoperability protocol (KMIP) via a set of one or more custom attributes. The system provides a mechanism by which clients pass additional metadata to facilitate enhanced key provisioning operations by a key management server. The protocol comprises objects, operations, and attributes. Objects are the cryptographic material (e.g., symmetric keys, asymmetric keys, digital certificates and so on) upon which operations are performed. Operations are the actions taken with respect to the objects, such as getting an object from a key management server, modifying attributes of an object and the like. Attributes are the properties of the object, such as the kind of object it is, the unique identifier for the object, and the like.

According to their disclosure, a first custom server attribute has a value that specifies a keygroup name that can be used by the key management server to locate (e.g., during a Locate operation) key material associated with a named keygroup. A second custom server attribute has a value that specifies a keygroup name into which key material should be registered (e.g., during a Register operation) by the server. A third custom server attribute has a value that specifies a default keygroup that the server should use for the device passing a request that include the attribute. Using these one or more custom server attributes, the client taps into and consumes/contributes to the key management server's provisioning machinery.

A shortcoming of the prior art teachings is that they do not teach techniques for managing encrypted storage resources based on metadata stored with the cryptographic keys in a key management system/server (KMS). Such a key-metadata based management system/console absent from the prior art would allow an administrator/admin to get a consolidated view of all encrypted resources along with related cryptographic objects including keys and digital certificates. Such a console absent from the prior art would also allow the admin to perform various management and administrative tasks on encrypted storage resources and related cryptographic assets, without having to access individual hosts/nodes. Such a design absent in the art would also not require a separate database for storing the key-metadata that could get out of sync with the KMS database.

OBJECTS OF THE INVENTION

In view of the shortcomings of the prior art, it is an object of the invention to provide techniques for the management of encrypted storage based on key-metadata stored alongside cryptographic keys in a key management system/server (KMS).

It is also an object of the invention to provide the above management via a console that offers a consolidated view to an administrator/admin of all encrypted resources and related cryptographic objects in the system.

It is also an object of the invention to allow admin to perform various administrative/management tasks on the console without having to access individual hosts/nodes.

It is further an object of the invention to not require a separate database for storing key-metadata that could get out of sync with the KMS database.

It is also an object of the invention to have secure and authenticated connections between various components/subsystems of the system.

Still other objects and advantages of the invention will become apparent upon reading the summary and the detailed description in conjunction with the drawing figures.

SUMMARY OF THE INVENTION

A number of objects and advantages of the invention are achieved by apparatus and methods for encrypted storage management based on key-metadata. The per-key key-metadata is stored with each cryptographic key stored in a key management system or server (KMS). The cryptographic keys are used to encrypt/decrypt corresponding storage resources.

Alternatively, the cryptographic keys are the wrapping keys (WK) for encrypting/decrypting or wrapping/unwrapping the data keys that are in turn used to encrypt/decrypt the corresponding storage resources. Regardless, there is one such (active) cryptographic key stored in the KMS along with its key-metadata for each encrypted storage resource. The key-metadata associates or ties the cryptographic key to its corresponding encrypted storage resource.

The encrypted storage resources are based on block storage of data. They may be connected to hosts or nodes that may be on-premise or remote. The storage resources may also be in the cloud. Exemplary hosts/nodes of above storage resources include storage/database servers, containers of a container management system including Docker™, Kubernetes™, OpenShift™, host of a platform-as-a-service (PaaS) environment including Cloud Foundry™, etc. Examples of cloud based encrypted storage resources include AWS™ EC2™, block storage objects in Google™ cloud platform (GCP), Microsoft Azure™, etc.

The encrypted storage resources which are based on block storage, may be implemented with one or more of a number of data storage technologies including standard disk drives and their partitions, solid state drives and their partitions, storage area networks (SAN), network attached storage (NAS), redundant array of independent disks (RAID), self-encrypting disks, etc.

There is also a console server that is in authenticated communication with the KMS. The console server drives a user interface of the present design which allows an administrator/admin to have an overall consolidated view of the entire encrypted storage system, without having to access individual hosts or nodes and unlike the techniques of the prevailing art. The overall view includes encrypted storage resources and related cryptographic objects including cryptographic keys and digital certificates.

The user interface further allows the admin to perform needed management/administrative functions on the encrypted storage system including key rotation, key revocation, certificate revocation, list subcommand/operation, state subcommand/operation, admin subcommand/operation, etc. Again, unlike the techniques of the prior art, the admin is able to perform these functions from a central console, rather than having to access individual nodes and hosts.

The user interface above may be a command line interface (CLI), a graphical user interface (GUI) preferably based on web technologies, or both. Preferably, the KMS supports the key management interoperability protocol (KMIP) standard version 1.1 or beyond. In such an embodiment, the attributes of key-metadata are stored as vendor attributes or custom attributes in the KMIP database.

In the preferred embodiment, the connections between the various subsystems are all authenticated. Preferably, the authentication is based on transport layer security (TLS) protocol. In the same or other embodiments, the connection between the console server and the KMS is mutually authenticated and based on mutually authenticated TLS (mTLS) protocol.

Preferably, the authenticated connections between user interface clients of the console server and the console server itself are based on one one-way TLS or alternatively mTLS. Preferably, there is a certificate authority (CA) in charge of issuing digital certificates for above authentication via TLS. In alternative embodiments, rather than using digital certificates a userid/username and password-based authentication scheme is used. The passwords are preferably protected by a salted hash.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

Figure 4:
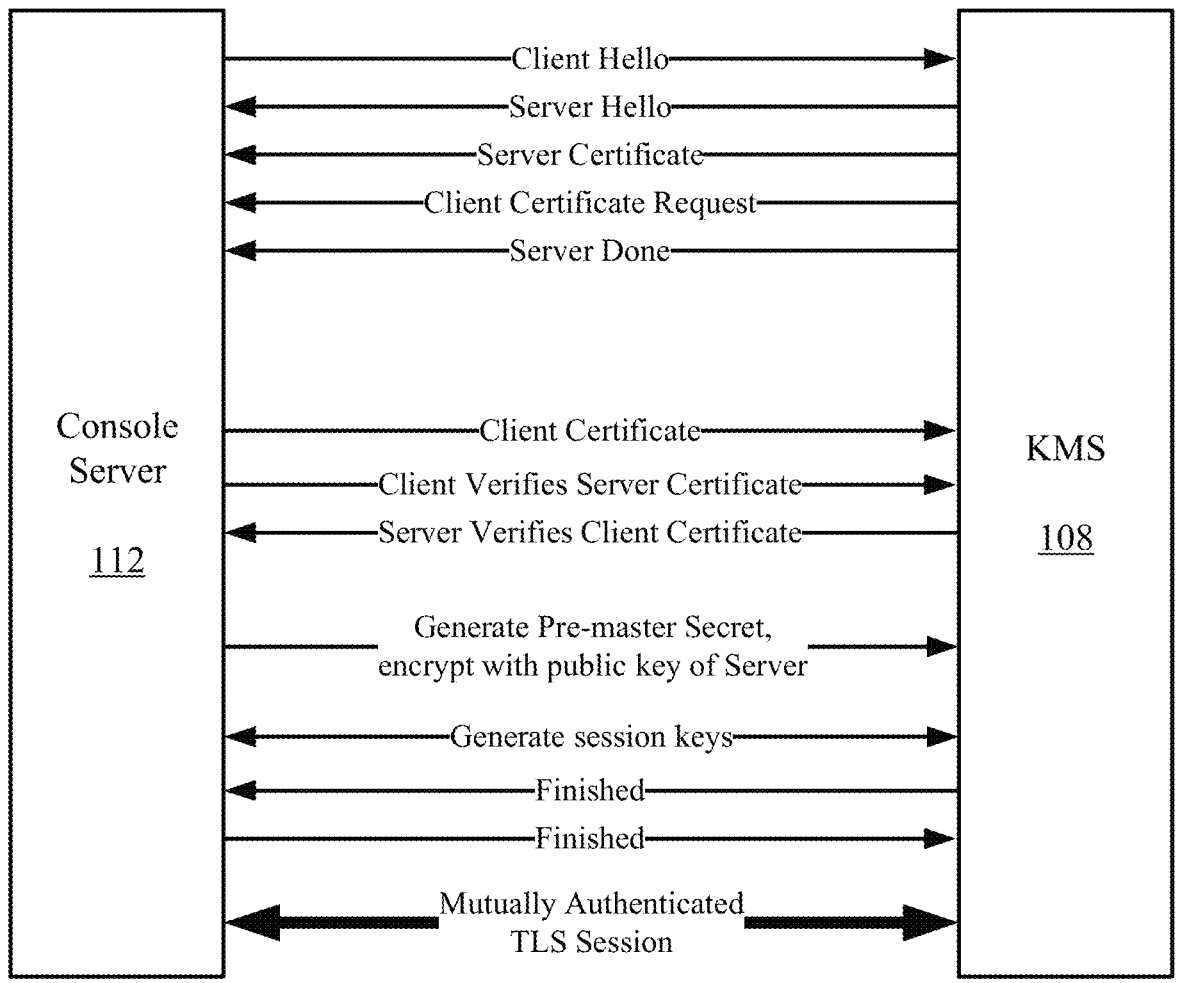

FIG. 4 pictorially shows the handshake performed by the instant console server and KMS for establishing a mutually authenticated connection via a mutually authenticated transport layer security (mTLS) protocol.

Figure 5:
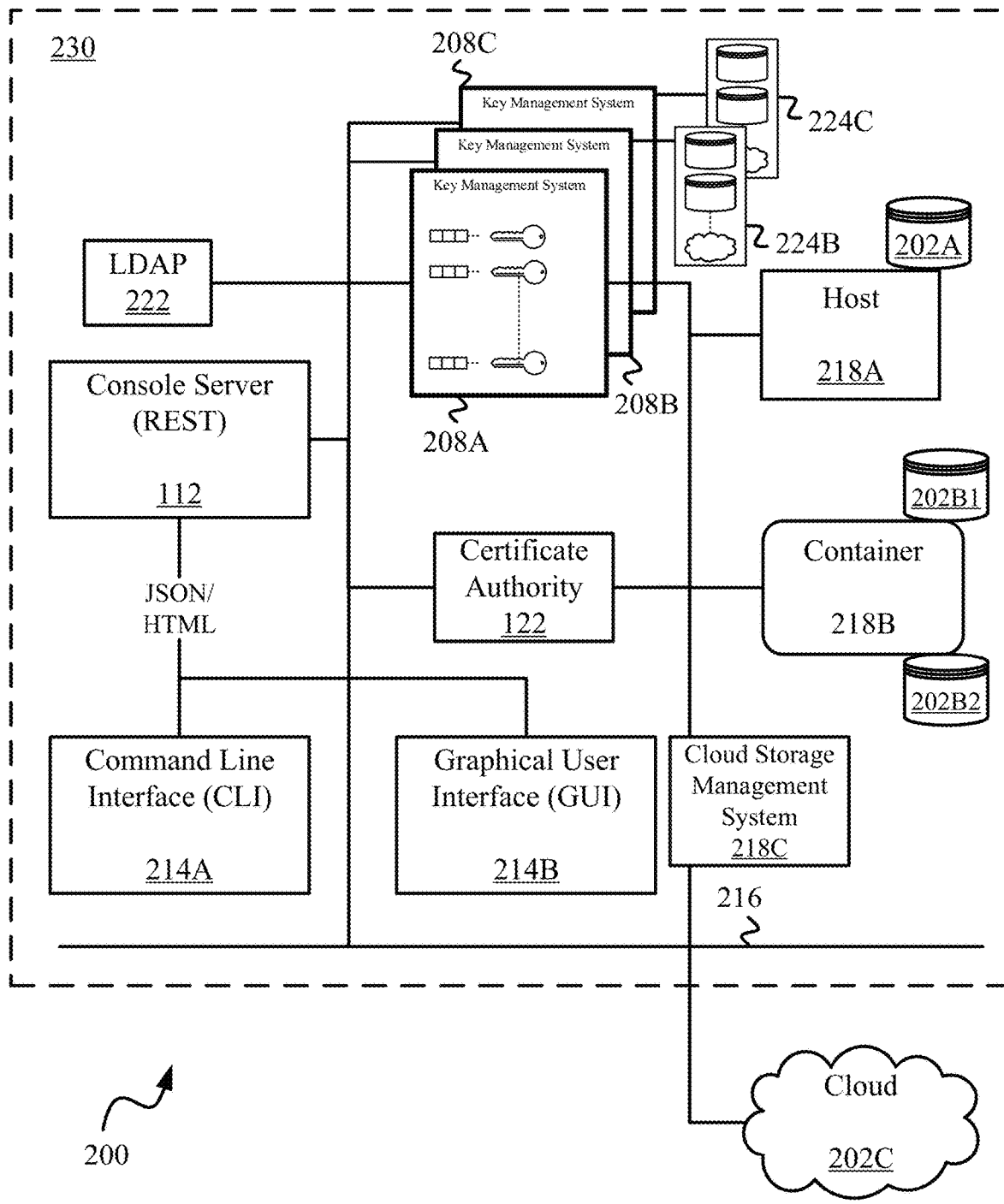

FIG. 5 shows a detailed diagram of an embodiment employing multiple KMSes.

Figure 6:
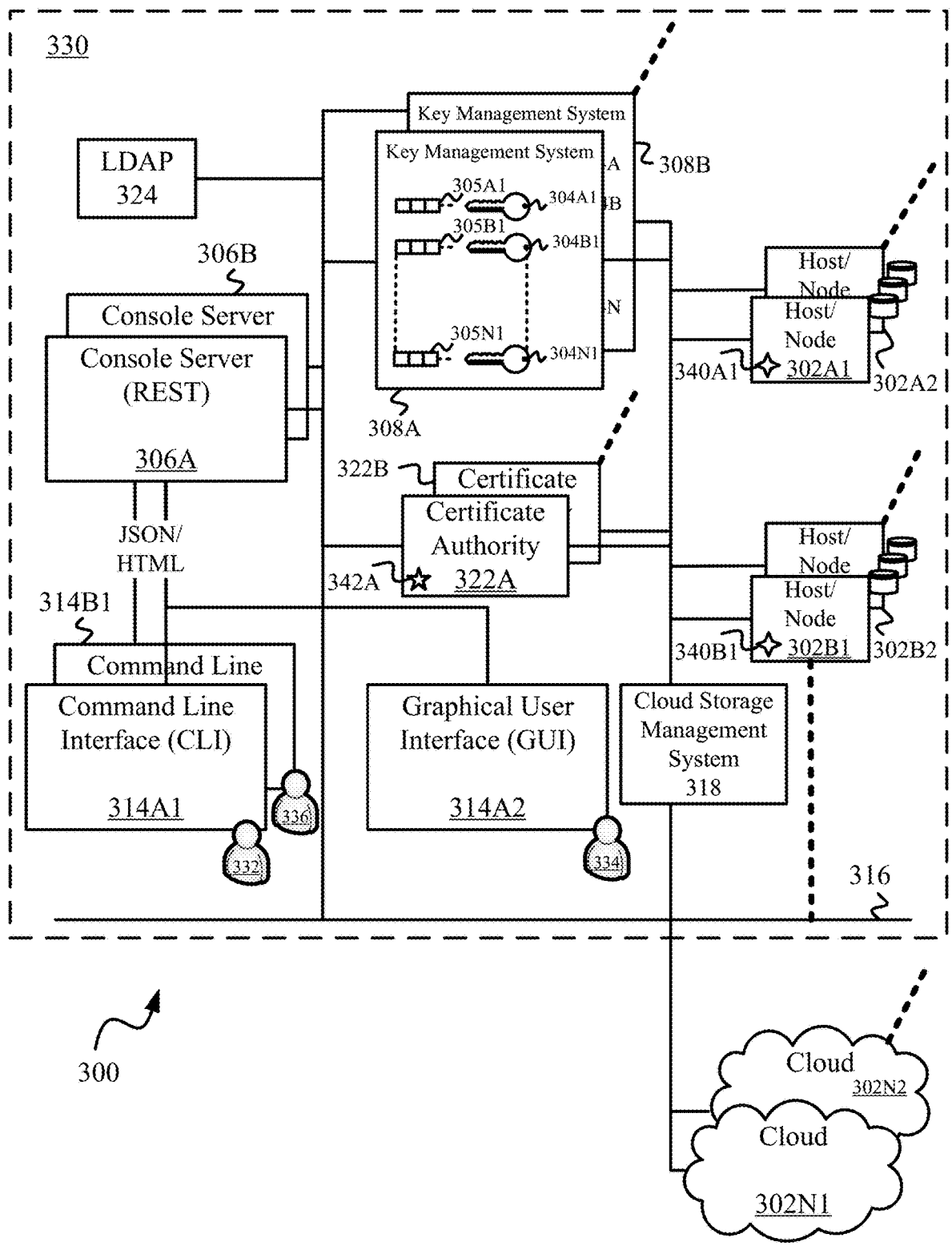

FIG. 6 shows a detailed diagram of a complex environment based on the instant principles, involving two console servers, multiple KMSes, multiple CAs and a variety of storage resources on a variety of hosts/nodes, both on-premise, off-premise/remote, or in the cloud.

FIG. 7A-B show the left-hand-side and the right-hand-side portions of the screenshot equivalent of a list subcommand from a GUI client of an instant console server of a specific implementation of the present technology.

FIG. 8 shows an almost equivalent screenshot of another form of a list subcommand from a GUI client of an instant console server of a specific implementation of the present technology.

FIG. 9 shows an almost equivalent screenshot of yet another form of a list subcommand from a GUI client of an instant console server of a specific implementation of the present technology.

FIG. 10 shows a screenshot from a GUI client of an exemplary implementation of the present technology showing the various userids/Logins and their roles/authorization levels.

FIG. 11 shows a screenshot from a GUI of an instant console server of an exemplary implementation that employs multiple KMSes as shown in the embodiments of FIG. 6.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
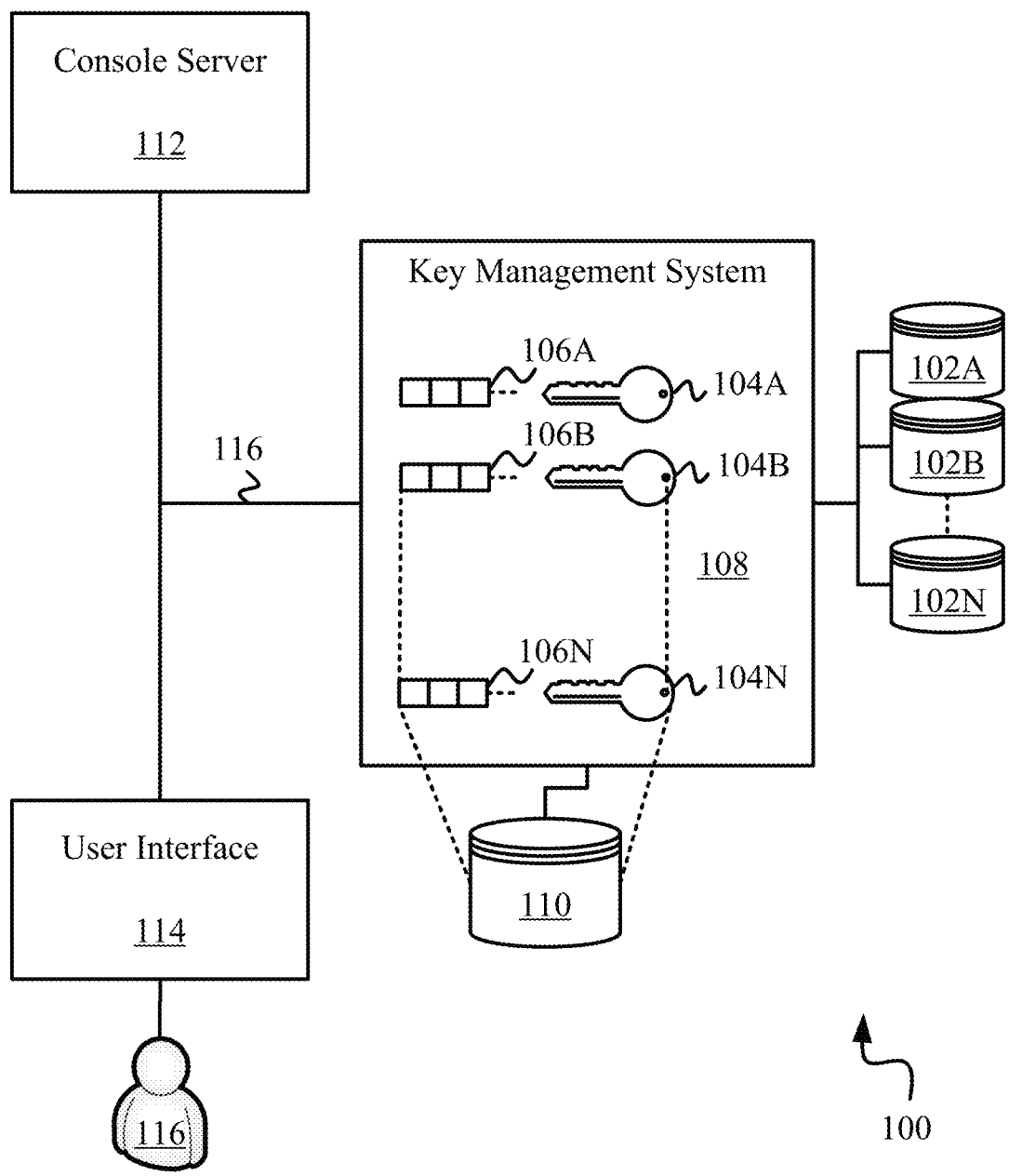
FIG. 1 is a block-diagram view of a key-metadata based/driven encrypted storage management system of the present technology.

The techniques described herein may employ computer code that may be implemented purely in software, hardware, firmware or a combination thereof as required for a given implementation. The present invention will be best understood by first reviewing the systems and methods for managing encrypted storage resources based on key-metadata as illustrated in FIG. 1. Specifically, FIG. 1 shows a secured or encrypted storage computer system 100 with a number of encrypted storage resources or items 102A, 102B, ... 102N.

Throughout this disclosure, by the term "encrypted storage resource", we mean a storage resource that is meant or targeted to be encrypted. It is understood that the encrypted storage resource may not necessarily be encrypted at some given moment in time. For example, this is the case when the storage resource is first installed and is about to undergo its first encryption or when it has been decrypted, such as before undergoing re-encryption during a key rotation operation. Nevertheless, for brevity and for clarity of explanation of these teachings, an encrypted storage resource will encompass any storage resource that is yet not encrypted but is meant to be encrypted, is encrypted, or has been decrypted from an encrypted form and is meant to be encrypted again.

The instant encrypted storage resources may be individual storage devices, such as disk drives and their partitions or solid-state drives (SSD) and their partitions, and utilize one or more of a number of available computer storage technologies including storage area network (SAN), redundant array of independent disks (RAID), network-attached storage (NAS), etc. These storage resources may be local/on-premise or remote/off-premise or in the cloud or a combination. For the purposes of this disclosure, these storage resources are logical units of block storage, exemplarily storage drives/devices (including disk drives and SSDs) or logical volumes created over a portion, or one or more such drives/devices or partitions thereof. Therefore, it is possible that more than one encrypted storage resources exist on multiple partitions of a single storage disk or one encrypted storage resource spans more than one storage disks. It is understood that the term storage disk or simply disk may refer to a disk drive or an SSD that does not involve a rotating disk.

Although computer system 100 may have storage resources that are unencrypted, those are outside of the purview of the present teachings and as such will not be discussed explicitly in this disclosure. In other words, the embodiments depicted and explained in reference to the drawing figures are only concerned with encrypted storage resources, such as encrypted storage resources 102 of FIG. 1. The encryption/decryption utilizes symmetric encryption employing encryption keys or cryptographic keys 104A, 104B, ... 104N either directly as data keys or through wrapping keys (WK) further discussed below. In either case, there is one such active cryptographic key 104A-N stored in the KMS for each encrypted storage resource.

In either case, keys 104A-N are volume or disk encryption keys and not file keys that are used for encrypting individual files.

Such file keys may also exist for encrypting individual files in storage resources 102A-N but are not necessarily the focus of the present technology. All the components or subsystems of system 100 are connected to a computer network 116 that is typically a local area network and is based on network technologies known in the art.

Before proceeding further, it is to be understood that for brevity in this disclosure, unless otherwise distinguished, the term encryption implies both encryption and decryption. As such, when we say that an encrypted storage resource is encrypted with a data key, we imply that the data key is meant to both encrypt and decrypt the storage resource as needed. In alternative embodiments, when we say that a data key is wrapped or encrypted by a WK, we imply that the WK is used to both encrypt and decrypt the data key as needed.

In an exemplary implementation, storage item 102A is encrypted/decrypted with cryptographic key 104A, storage item 102B is encrypted/decrypted with cryptographic key 104B, and so on. In such embodiments, cryptographic keys 104A-N are actual data keys used directly to encrypt storage resources 102A-N respectively. However, a highly preferred set of alternative embodiments of our encrypted storage management system 100 of FIG. 1, are presented in FIG. 2.

Figure 2:
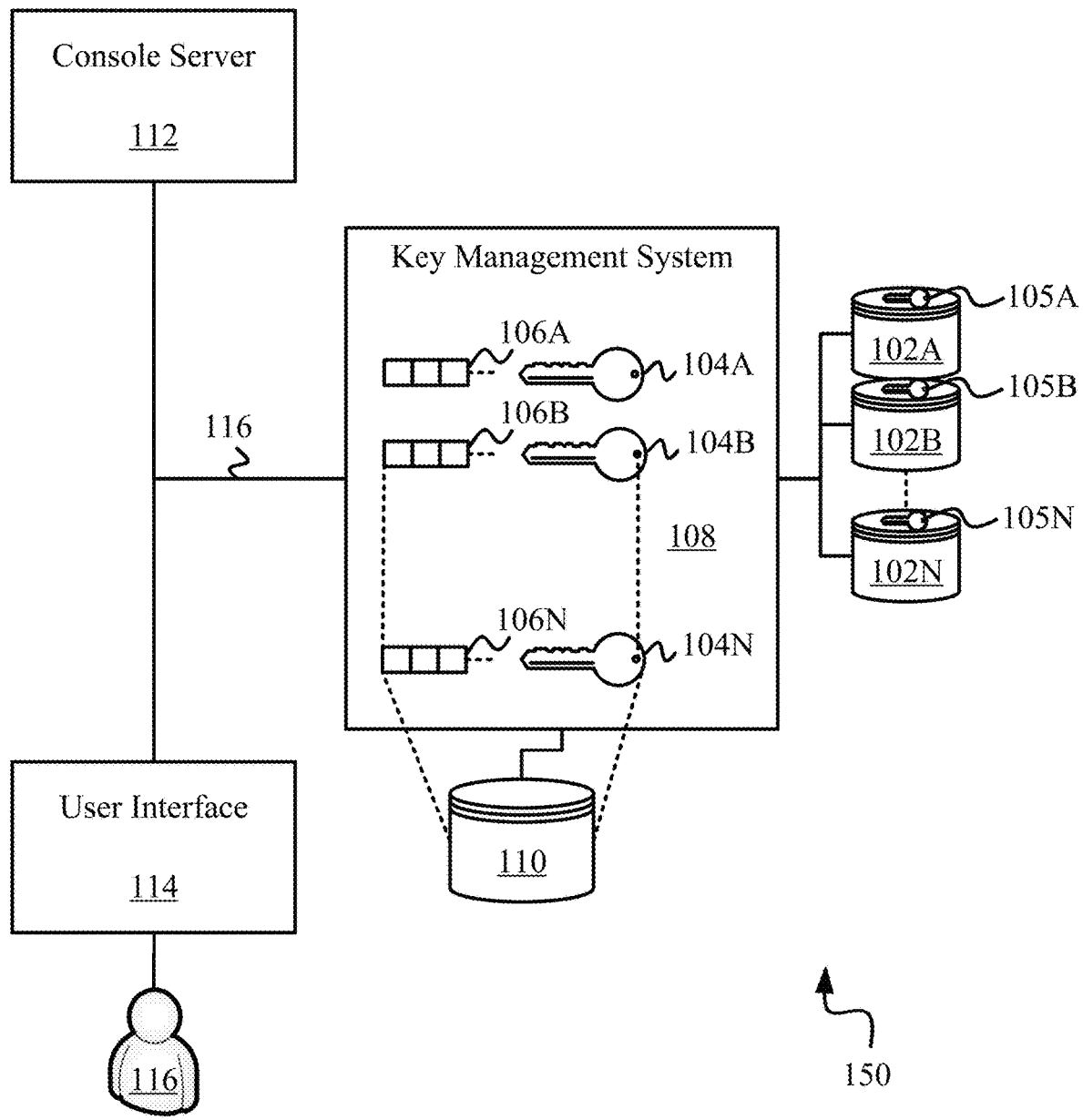
FIG. 2 is a variation of FIG. 1 where the cryptographic keys stored in the key management system/server (KMS) are not the data keys, but the wrapping keys (WKs) for the data keys.

FIG. 2 shows a key-metadata based/driven encrypted storage management system 150 of the present design. In FIG. 2, cryptographic keys 104A-N are wrapping keys or WKs that are in turn used to encrypt/decrypt or wrap/unwrap respective data keys 105A-N used for encrypting/decrypting storage resources/items 102A-N. As shown, encrypted data keys 105A-N are stored locally on respective storage resources 102A-N and must be first decrypted with the respective WK 104A-N before encrypting/decrypting respective encrypted storage resource 102A-N. As a result, data keys 105 are never stored in their unencrypted form on respective storage resources 102.

Whether they are data keys of FIG. 1 or WKs of FIG. 2, cryptographic keys 104A-N are stored in a key management system or key management server (KMS) 108 shown in FIG. 1 and FIG. 2. More specifically, keys 104A-N along with their respective/related key-metadata or simply metadata 106A-N are stored in database 110 of KMS 108. Database 110 is a highly secure and dedicated database from which KMS 108 stores and retrieves keys. KMS 108 may be implemented using a number of available key management technologies including key management interoperability protocol (KMIP). As such, a KMS may also be referred to as a KMIP server in the below embodiments. Each key 104A, 104B, . . . 104N is stored in KMS 108 along with respective key-metadata/metadata 106A, 106B, . . . 106N.

Key-metadata 106A-N associates corresponding cryptographic keys 104A-N and to respective encrypted storage resource 102A-N. The metadata comprises one or more attributes or fields or elements. In the preferred embodiment, these attributes are the custom attributes or vendor attributes supported in KMIP version 1.1 and beyond. As noted, attributes of key-metadata 106A-N are used to tie or associate cryptographic keys 104A-N to respective encrypted storage resources 102A-N for managing/administering such resources in system 100 of FIG. 1 and system 150 of FIG. 2 based on the principles taught herein.

According to the chief aspects of the present design, the association of the cryptographic keys to the encrypted storage resources is used to present/generate a user interface for managing the encrypted storage resources and their associated cryptographic keys. More specifically, a console server 112 in conjunction with a user interface 114 takes advantage of this association to drive the above-mentioned user interface for administrative users. The user interface further incorporates other cryptographic objects of the system, such as digital certificates as will be taught further below.

In the techniques of the prior art, an administrator/admin would need to access each storage host/node associated with an encrypted storage resource to perform various administrative tasks. In addition, the admin would need to access the KMS and a certificate authority (CA) if present, for performing related administrative functions involving cryptographic keys and certificates.

In contrast and as will be taught herein, the present technology presents an overall and consolidated view of all encrypted storage resources and cryptographic objects such as keys/certificates to the admin. The instant design does so based on key-metadata and by utilizing console server 112 and user interface 114 that further allow the admin to perform the needed administrative tasks on those resources and their associated cryptographic objects. Thus, a typical user of such a user interface is an administrator or a specialized security administrator or admin 116 shown in FIG. 1/FIG. 2. User interface 114 powered by console server 112 may also be referred to as the central console or the management console or the central management console or simply the console.

There are a number of advantages afforded by the present design of managing encrypted storage by utilizing key-metadata 106A-N, over the techniques of the prevailing art. These are at least:

Since cryptographic keys 104A-N and related respective key-metadata 106A-N stored in KMS 108 is often cryptographically protected and in a secure database/server 110, this prevents attacks on the key-metadata.

Since key-metadata 106 is stored with cryptographic keys 104, a separate metadata database that could get out of sync with KMS database 110, is not required. Since KMS 108 is already in charge of keys 104, no extra database is required at all in the current design.

Since most KMSes use standardized application programming interface (APIs), such as KMIP or representational state transfer (REST) APIs, this facilitates implementation of the present technology.

Per-key key-metadata 106A-N related to respective keys 104A-N may comprise any number and type of attributes needed to drive the above-mentioned user interface. The following list provides exemplary attributes along with their meanings in the preferred embodiments. Exemplarily, these are the attributes stored as metadata 106A for key 104A, as metadata 106B for key 104B, and so on in KMS 108 and specifically its key database 110 of FIG. 1-2. Still differently put, these are the key-metadata elements/fields/attributes stored with each key 104A-N, for example, cryptographic key 104B of FIG. 1-2:

1. Metadata version: A version number associated with a specific implementation of the present technology, so that it can be later identified by this metadata version number, for example, 0.9, 1.0, 1.1, etc.
2. Product type or simply Product: A descriptor or label associated with the encrypted storage resources that identifies its type or characteristics and/or the manner it is used. Exemplarily, specific values of this attribute signify that cryptographic key 104B of FIG. 1 or corresponding data key 105B of FIG. 2 is used for encrypting the following types of storage resources as given by those values. These values are given below for a specific implementation:
    Full-disk(FD)/partition: an entire disk or an entire partition is encrypted by key 104B. Such a disk/partition may be local to a host or it may be provisioned on a host of a PaaS environment, including Cloud Foundry™ and the like, which in in turn may have been installed with BOSH™ project.
    Dkr: where a storage volume assigned to a Docker™ container is encrypted with key 104B.
    Knt: where a storage volume assigned to a Kubernetes™ container is encrypted with key 104B.
    Opns: where a storage volume assigned to a OpenShift™ container is encrypted with key 104B.
    EC2: where an Amazon™ web services (AWS™) elastic cloud computing (EC2™) object is encrypted with key 104B.
    GCP: where a block storage object in Google™ cloud platform (GCP™) is encrypted with key 104B.
3. Hostname: As applicable, the hostname is the fully qualified domain name (FQDN) or an internet protocol (IP) address of the server or node or localhost/host or storage host/node or container on computer network 116 and to which the encrypted storage resource associated with cryptographic key 104B is connected. This field is not applicable if the storage item is in the cloud, such as an EC2 or a GCP object mentioned above.
4. Certificate serial number: If the implementation utilizes digital certificates, then the serial number of the digital certificate issued by a certificate authority (CA) for authenticating the host that is associated-with/connected-to the encrypted storage resource to which cryptographic key 104B belongs.
5. Storage resource identifier or Object identifier: An identifier for identifying the specific encrypted storage resource that is encrypted by data key 104B of FIG. 1 or data key 105B of FIG. 2 that is wrapped by WK 104B. Exemplary values can be a directory path or label for identifying a disk/partition on a host/node, a region/bucket/file triple for an AWS EC2 object, a BOSH disk storage identifier for a BOSH™ environment, a storage volume identifier for a container, etc. or any equivalent method of unambiguously locating the storage resource in system 100/150 of FIG. 1/FIG. 2.

6. Key type: The type of encryption algorithm utilized for encrypting and decrypting corresponding storage resource 102B with cryptographic key 104B or for wrapping/encrypting and unwrapping/decrypting data key 105B of FIG. 2 with key 104B per above. Exemplary values include American encryption 7. Deployment name or simply Deployment: A meaningful text field or label indicating which Product(s) above are associated together for any given purpose. Deployments will be further discussed below. Exemplary values of this attribute are company_1, database, webserver, etc.

8. Activation date: Date and timestamp at which key 104B was activated.

9. Expiration date: Date and timestamp at which key 104B will expire.

10. Rotation period: Length of time after which key 104B needs to be rotated.

11. Key state: Current state of the key, for example, Active, Revoked/Retired, etc.

The above key-metadata attributes may be entered and maintained in KMS 108, and specifically its database 110, manually or via a script. For this purpose, an appropriate user interface already available for KMS 108 may be used. Alternatively, or in addition, a script can be used that finds the above key-metadata attributes in appropriate locations on system 100/150 of FIG. 1/FIG. 2 and updates them in respective key records of KMS 108.

In various embodiments, instead of or in addition to the above fields, any other fields may be stored in key-metadata 104A-N in order to support the needs of an implementation. For example, a mount point for the storage items may also be stored. Similarly, a mount time field indicating at which time the storage resource/item was mounted may also be stored, and so on.

Furthermore, the key-metadata above preferably does not include fields that may already exist in KMS 108. For example, KMS 108 may already store Activation date and Expiration date information with each key in its key database. As such, those fields are then not used or dropped from the above key-metadata fields/elements/attributes.

Figure 3:
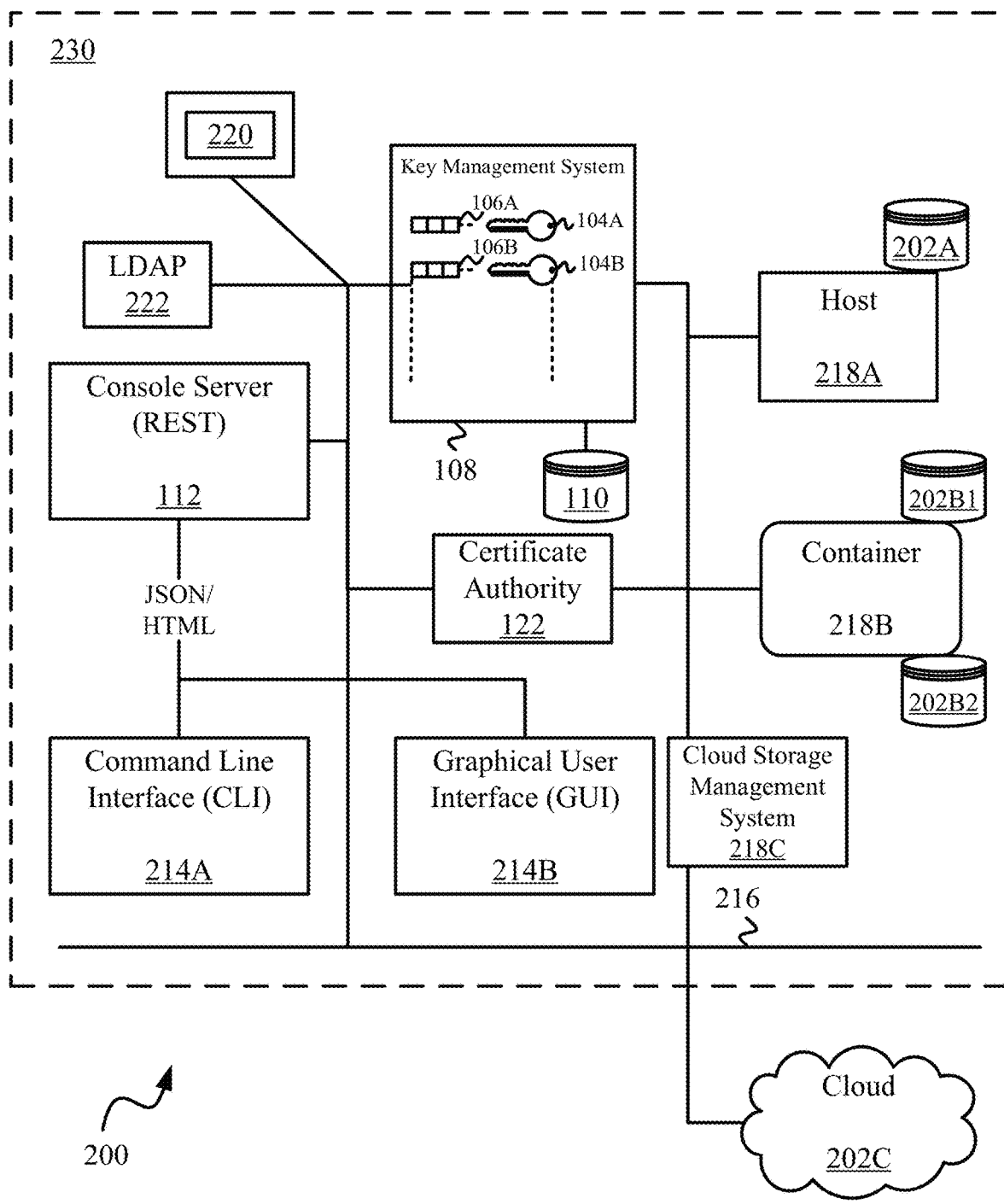
FIG. 3 illustrates embodiments of the present technology with additional details and components, including a command line interface (CLI) client and a graphical user interface (GUI) client of the console server, a certificate authority (CA), a lightweight directory access protocol (LDAP) server, etc.

Let us now look at the detailed architectural diagram of FIG. 3 to further understand the inner workings of the present technology. FIG. 3 is a variation of FIG. 1 and FIG. 2 with some of the same elements and numerals as well as some new components. Further, some of the elements or subsystems from FIG. 1/FIG. 2 are not explicitly shown to avoid detraction from the main principles being taught. FIG. 3 shows a key-metadata based encrypted storage management system 200. It shows console server 112, KMS 108 with database 110, cryptographic keys 104 and key-metadata 106 from FIG. 1/FIG. 2. Secured storage system 200 of FIG. 3 also shows a hardware security module (HSM) 220 connected to KMS 108. An HSM is a specialized and hardened storage system that is used to store cryptographic keys as well as master keys by KMS 108.

Preferably, HSM 220 further hides its data using additional layers of encryption with other obscured keys. These obscured keys may be randomly generated and then stored in the HSM 220 or on other secure locations remote from system 200 of FIG. 2. It is often the case that a customer-owned KMS/KMIP server is its own certificate authority (CA) that issues digital certificates to the components/modules/servers connected to system 200. In such a scenario, internal CA 122 is not needed and if present, can be turned off.

FIG. 3. also shows a CA 122 that is now responsible for issuing digital certificates for authentication of various subsystems/components/elements and hosts connected of computer system 200 of the present design. Furthermore, secured storage system 200 of FIG. 3 shows two user interfaces 214A and 214B for allowing an admin (not shown) to manage storage resources 202A, 202B1, 202B2 and 202C. User interface 214A is a command line interface (CLI) while user interface 214B is a graphical user interface (GUI). In various embodiments of the present technology as described in this disclosure, one or both of a CLI and a GUI user interface or client may be present. Of course, one can have any number of instances of CLI and/or GUI clients as needed.

FIG. 3 explicitly shows system 200 to be operating at a premise or site or customer/client site 230 on a computer or client or customer network 216 and to which various subsystems and modules of system 200 are connected. Network 216 typically comprises a local area network for the entity/organization owning/operating site 230 and is based on network technologies known in the art.

The master keys mentioned above are used by KMS 108 to provide additional layers of encryption around cryptographic keys 104A-N. Oftentimes, KMS 108 comes integrated with an HSM and is therefore treated as a "black-box" module containing an HSM, as will be appreciated by skilled artisans. Therefore, in order to avoid detraction from the main principles being taught, we may treat KMS 108 with HSM 220 as such a black-box without delving into the details of the handshake that occurs between the KMS and HSM behind the scenes and known to skilled artisans. There may be more than on key management systems/servers (KMS) on network 216 as shown in FIG. 2. Moreover, some or all of the KMS(es) may be on-premise and connected locally to computer network 216 while some or all of them may be remote or outside the firewall of site 230.

In an exemplary implementation, the protocol followed by user interfaces 214A-B to communicate with console server 112 is JavaScript Object Notation (JSON) over HTML as shown in FIG. 3. In the same or another embodiment, console server 112 deploys a web server which is preferably an Apache Tomcat web server utilizing representation state transfer (REST or RESTful) technologies. Such a design ensures that various types of browser clients can be supported by console server 112 in order to achieve its objects in an interoperable manner. This is done by allowing these browsers/clients to access console server and its resources via a uniform resource location (URL).

FIG. 3 also shows a storage host system or storage node or simply a host or node 218A that has an encrypted storage item or resource 202A operably connected to it. In one variation of embodiment 200, node 218A is a Hadoop data node, otherwise it may be a dedicated storage server/system installed in an on-premise or an off-site facility such as a data center. There is also a container 218B that may be a Docker™ container or a Kubernetes™ container or an OpenShift™ container.

The respective container management system (not shown in FIG. 2) of container 218B has assigned it two storage resources 202B1 and 202B2 that are operably connected to it. Storage items/resources 202B1-2 may or may not be a part of the same storage volume. FIG. 3 further shows a cloud storage management system or host 218C interacting with a cloud storage resource 202D such as an AWS™

Cloud Storage, and exemplarily AWS™ EC2™ or any other block storage service including Google™ cloud platform (GCP), Microsoft Azure™, etc. Cloud storage management server/system/host 218C shown operating on network 216 may be optional and if present, is responsible for interacting with the specific cloud storage resource per the API of the resource and for performing any local data transformations as necessary. The potential capabilities of such a cloud storage management system will be further explained in reference to FIG. 6.

Cloud storage resource 202D may even be in a semi-private or a private cloud and accessible via a platform-as-a-service (PaaS) layer of a cloud computing model. Exemplarily, such a PaaS layer may include the foundation of a Cloud Foundry™ deployment that may be deployed in a BOSH™ environment. There may be one or more of the above types of cloud storage systems used in a given environment. Regardless, cloud storage system 202C is accessible from network 216 via an application programing interface (API) or URL's specific to the type storage system, and as needed, via a local cloud storage management server 218C per above.

Now let us take a closer look at the detailed operation of secured storage system 200 of FIG. 3. In the below discussion, special attention will be paid to console server 112 and its capabilities including user interfaces 214A-B. This is because the present design of console server 112 provides management of encrypted storage items/resources on network 216 that is based on key-metadata stored with cryptographic keys in KMS 108, and is an innovation over the techniques of the prevailing art. For this purpose, let us start with authentication.

Authentication

In a highly preferred embodiment, connections between console server 112 and various modules and components of secured computer system 200 are authenticated and secured. In such an embodiment, connections between console server 112 and KMS or KMIP server 108, as well as CA 122 and storage resources 202A-D are all encrypted and secured. Preferably, this is accomplished by utilizing transport level security (TLS) for these connections, and preferably for this purpose digital certificates issued by CA 122 are used. In a variation however, username/userids and passwords are used. In still other variations, other authentication techniques known in the art may be employed including Kerberos tokens, etc.

Although it is highly desirable to have CA 122 as a part of secured storage system 200, it is not a requirement of the present design. Therefore, in one embodiment, CA 122 shown in FIG. 3 is either not present or if present, is not used. In such an embodiment, console server authenticates itself to KMS or KMIP server 108 by utilizing a username and password scheme. The username and passwords are stored in a secure and local database, such as a key database 110 of KMS 108 or a lightweight directory access protocol (LDAP) server 222 discussed further below or in files. While such an embodiment can function with usernames and passwords stored as cleartext/plaintext, it is highly desirable to at least have the passwords stored as salted hashes. Therefore, in still another variation of the above embodiment the passwords are hashed with a salt and only the usernames and the resultant password-hashes are stored on the server/database.

As noted, that in some variations of the above embodiment the usernames/passwords or more specifically, usernames/password-hashes are stored in LDAP server 222 shown in FIG. 2. More specifically, the usernames, passwords, permissions for users on network 216 of FIG. 3 including credentials for clients 214A-B as well as console server 112 are stored in an LDAP database service or simply LDAP database/server 222. Exemplary LDAP database servers/services or simply LDAP databases for this purpose include Microsoft's Active Directory™ service, OpenLDAP™, etc.

Let us now pay special attention to the embodiments utilizing a CA, such as CA 122 shown in FIG. 3. In order to understand authentication of various modules in the present design, we will describe the authentication between console server 112 and KMS 108 for an exemplary implementation in great detail. From then onwards, to avoid unnecessary repetition, the same concepts are understood to extend to other modules as noted, without having to delve into the same level of detail so as to maintain focus on the key principles being taught.

Authentication Between Console Server 112 and KMS 108

In the preferred embodiment, the connection between console server 112 and KMS server 108 is a mutually authenticated TLS or mTLS based on digital certificates issued by CA 122. Skilled artisans will understand the basic principles behind an authentication mechanism using a CA. CA 122 may be on-premise at site 230 of secured storage system 200, or it may be remote or off-premise from computer network 216 operating at site 230. In the latter case, it may still be accessible to network 216 via secured connection based on known techniques. It is sometimes desired that rather than using an external CA, an internal CA, for example CA 122, be deployed on-premise at site 230 in order to efficiently and cost effectively issue digital certificates to the systems connected to client network 216.

As noted, the connection between console server 112 and KMS server 108 is a mutually authenticated TLS or mTLS based on digital certificates issued by CA 122. In order to accomplish this, when system 200 is installed, a public-private key-pair is generated for KMS 108. The private key of the key-pair is stored in KMS 108, and specifically its HSM 220 or key database 110. Alternatively, it may be stored in a trusted platform module (TPM) connected to KMS 108. The public key is incorporated into a digital or public key certificate for KMS 108 that is digitally signed by CA 122.

Explained further, when KMS 108 first boots up in secured storage system 200, it sends the public key of the above key-pair along with its identity information in a certificate signing request (CSR) to CA 122. First, using its private key of the above key-pair, KMS 108 signs the CSR. More specifically, it encrypts its identity information in the CSR and includes the encrypted ciphertext or hash in the CSR along with the plaintext identify information. The identity information of KMS included with the CSR may be a shared secret that proves its identity.

Such a shared secret is preferably passed to it by an installer script(s)/program(s) that were used for the installation of the KMS and various other modules/subsystems of system 200 of FIG. 3. In such a scheme, the installer initially shares the shared secret with any subsystem/module that it knows would be sending a CSR to obtain a certificate. In alternative embodiments, the identity information in the CSR may be a Media Access Control (MAC) address and/or the fully qualified domain name (FQDN) of the module/ subsystem sending the CSR on network 216, or still other attributes specifying its identity.

Upon receiving the CSR, CA 122 first ensures the authenticity of the CSR by verifying its signature. It does this by decrypting the hash in the CSR with the public key of KMS 108 obtained from the CSR. If the decryption is successful, or in other words if the decrypted text matches the plaintext (identity information) in the CSR, then the authenticity of the CSR is verified. Once the CSR is verified, CA 122 validates KMS 108 to ensure that it is what it says it is. In other words, it validates the identity information for the KMS received in the CSR. For this purpose, it ensures that the MAC address and/or FQDN of the KMS in the CSR is indeed the MAC/FQDN of server 108.

In other embodiments, CSR 122 may apply other tests to validate the identity of KMS server 108 identified in the CSR. For instance, CA 122 may apply "real world" tests to ensure that. This may be especially true if CA 122 is off-premise from site 230. These real world tests may include verifying the domain name registration information of KMS 108 and/or ensuring that the distinguished name (DN) of the subject is the bona fide entity issuing the CSR, and/or even employing emails/telephone confirmations, etc. as and if needed. Once the identity information is validated however, CA 122 creates a digital certificate for KMS 102, which is preferably in X.509 format.

The certificate assures the "relying party" that the DN identified in the certificate is what it says it is, and is the bona fide owner of the private key associated with the public key included in the certificate. CA 122 then signs the certificate by encrypting the certificate body with its own private key and appending the resulting hash or signature or ciphertext to the certificate. The private key of CA 122 may also be stored in database 110 or HSM 220. Alternatively, it may be stored in a TPM connected to CA 122. In general, the private key of any subsystem/module on network 216 may be stored in a dedicated TPM connected to the subsystem/module. Now, whether on-premise or a trusted external CA, the public key of CA 122 is known by every "client" module in the system. Specifically, the public key of the CA is stored in their trusted certificates stores or simply trusted stores.

At this point, CA 122 issues or sends KMS 108 its signed digital certificate that KMS 108 stores in HSM 220 or database 110. Let us call this certificate as KMS server certificate. This digital certificate along with the included public key of KMS 108 then stays active during the operation of system 200 or for the duration specified in the certificate or until revoked by CA 122.

Using an analogous process as explained above, CA 122 also issues a signed digital certificate to console server 112 containing the public key of the console server. This digital certificate is preferably stored in a file on console server 112. Alternatively, it may be stored in a database. Let us call this digital certificate of console server 112 as console client certificate because it allows the console server to authenticate itself to KMS 108 as a "client". Note that the term client here refers to console server 112 as being a client of KMS 108, in addition to it being a server for its user interface clients 214A-B. Each subsystem holding a digital certificate(s) may store it locally or all or subset of digital certificates issued by CA 122 may be stored in an appropriate database or storage on network 216, including HSM 220.

Preferably, the "usage" extended field of the above X.509 KMS server certificate specifies it as a KMS server certificate and the usage field of the console client certificate specifies it as a client certificate. This ensures that any party relying on console client certificate of console server 112 understands that it is acting as client to KMS, and not itself acting as a KMS server. Such a scheme can prevent unintended, accidental or malicious use of the certificate by a user of console server/subsystem/module 212. A careful and informed use of the usage field can prevent such security exposures/scenarios in general.

In a similar manner per above, CA 122 also issues digital certificates for storage resources/items 202A-D, and specifically to their respective hosts, containers, platforms, etc., including host 218A, container 218B, cloud storage management system 218C. With console server 112 and KMS 108 each having a valid digital certificate issued by CA 122, let us now look at the mutual TLS handshake that occurs between console server 112 and KMS 108 for authentication.

mTLS Handshake Between Console Server 112 and KMS 108

When console server 112 makes a connection via a TLS handshake to KMS 108, it first sends a Client Hello message to KMS 108. KMS 108 in turn sends console server 112 its KMS server certificate obtained above, as well as a client certificate request. In response to client certificate request, console server 112 sends KMS 108 its console client certificate obtained above. Both KMS client and server certificates are signed by CA 122 per above.

Both console server 112 (client) and KMS 108 (server) verify the respective certificates received from the other party. More specifically, console server 112 verifies the signature in KMS server certificate by decrypting the signature in the certificate with the public key of CA 122 pre-known to the console server. If the decryption is successful, i.e. the decrypted text matches the plaintext certificate body, then this guarantees to the console server that the digital certificate was indeed signed by CA 122 which it already trusts. This verification guarantees to console server 122 that KMS server certificate along with the included public key indeed belongs to KMS 108 and KMS 108 is what it says it is. By converse verification process KMS 108 verifies console client certificate obtained from console server 112.

After the above mutual certificate verification, both console server 112 and KMS 108 now generate session keys based on an agreed upon secret, and establish secure communication between each other. The secret is a pre-master secret generated by the console server, then encrypted with the public key of KMS and sent to the KMS. The KMS then obtains the pre-master secret because it can decrypt the secret with its private key. The session keys are then generated by both console server and the KMS and verified by each other by being able to decrypt each other's Finish messages. Now the two subsystems can securely communicate with each by encrypting/decrypting each other's messages by the session key. This mTLS handshake based on digital certificates and the establishment of a mutually authenticated TLS connection between console server 112 and KMS 108 is pictorially depicted in FIG. 4 for clarity of explanation.

Authentication Between User Interfaces 214A-B and Console Server 112

In the preferred embodiment, the connections between user interfaces 214A-B and console server 112 are also secured. This can be accomplished in a number of ways. In one embodiment, these connections are secured by mutual TLS in a manner analogous to the mutual TLS authenticated connection between console server 112 and KMS 108 explained in detail above.

Explained further, CA 122 issues a console server certificate to console server 122 per above explanation. This is the certificate that console server 112 uses to authenticate to the clients. In an analogous manner CA 122 also issues digital certificates to user interfaces or clients 214A-B for authenticating to the console server. Then console server 112 and its client or user interface 214A perform an mTLS handshake in an analogous manner per above to generate a session key and establish an authenticated and secure connection between each other. Similarly, console server 112 and its client or user interface 214B also establish a secure and authenticated connection between each other. From then on, these modules preferably communicate by utilizing HTML messages with JSON payload.

In another variation, console server 112 authenticates itself to user interface clients 214A-B via a one-way TLS, but the clients 214A-B authenticate themselves by using a username/password scheme. Such a scheme eliminates the need to issue digital certificates to each client of console server 112. In such a variation, user interface 214A-B use the basic authorization (BA) model of HTTP protocol known in the art. Furthermore, the passwords are stored as salted hashes. Each hash is preferably at least 24 bytes long before hashing.

What this means is that the hash is computed over a combination of a salt and the real (unencrypted) password that only stays in memory at login and never gets written to any permanent storage. The length of salt+password is preferably >=24 bytes/characters. In various embodiments, the lengths of salt:unencrypted password may be 16:8, 16:16, 16:24, 12:12, 12:16, etc. The hash or ciphering algorithm is preferably pbkdf2-sha512 with preferably 10,000 or more iterations. Alternatively, the hashing algorithm is bcrypt with preferably 2000 or more iterations.

Of course, any other form of suitable hashing algorithm, number of iterations, and type of encoding for passwords may be employed within the present scope, and as per the needs of an implementation of system 200 of FIG. 3. The usernames and salted password-hashes are preferably stored in LDAP 222. LDAP 222 may use alternate forms of password hashing other than pbkdf and bcrypt. Alternatively, if LDAP 222 is not present or not being used, the usernames and password-hashes are stored on console server 112 itself, either as files or in a database (not shown). Furthermore, the authentication of hosts 218A, 218B, 218C may also be implemented based on above teachings using one of a number of techniques including digital certificate-based, username/password based, etc.

Roles and Authorizations

After having understood the authentication mechanisms between console server 112 and various modules and subsystems of system 200 of FIG. 3, let us now understand the various types of users, their roles and authorizations. Note, that these are the users of instant system 200 and not the end-users of computer network 216.

In the preferred embodiment, there are at least 3 types of users. These are:

1. Root admin user: There is one root admin user or simply a root admin that is created by those responsible for the initial installation of system 200 at site 230 of FIG. 3. After the initial installation, a root admin can create other standard/regular admins, but not another root admin. Alternatively, a root admin may also be allowed to create another root admin.
2. Standard admin: In the preferred embodiment, a root and standard or regular admin user can perform all administrative tasks via console server 112 and its clients 214A-B per below teachings. However, a standard admin user is not able to create or delete any other admin user, including read-only admins (explained below). In alternative embodiments, a standard admin may be allowed to create and delete other read-only admins.
3. Read-only admin: A read-only admin can only perform read-only tasks via console server 112 and its clients 214A-B as further explained below. Moreover, a read-only admin cannot create or delete any other type of users.

In other embodiments, more granular permissions of tasks that may or may not be performed by admins and users are provided via a suitable role-based access control (RBAC) scheme/model.

After having discussed authentication and authorization capabilities of key-metadata based encrypted storage management system 200 of FIG. 3, let us now look at the rest of its capabilities as accessible through user interfaces 214A-B of console server 212.

Adding and Deleting Key Management Servers (KMS)

The present technology can support more than one KMSes as and if required for a given environment. Such a configuration is shown in FIG. 5 which is a variation of FIG. 3. As compared to FIG. 3, FIG. 5 shows three key management systems/servers or KMIP servers 208A, 208B, 208C. Reference numerals for cryptographic keys and their metadata held by the KMSes are not explicitly shown in FIG. 5 to avoid clutter.

KMS 208A is responsible for storing cryptographic keys for encrypted storage resource 202A of host 218A, 202B1-2 of container 218B and cloud storage resource 202C via cloud storage management system 218C of above discussion. Moreover, KMSes 208B and 208C are responsible for storing keys for storage resources 224B and 224C respectively. The hosts or platforms associated with storage resources 224B and 224C are not shown to avoid clutter. Any number of KMSes beyond KMSes 208A-C may be present.

As before, the storage resources or disks/devices/partitions may be locally connected to storage hosts/nodes, assigned to containers of a container management system, provided through a PaaS system, such as the foundation of a Cloud Foundry™ deployment exemplarily via BOSH™, provided by a cloud storage vendor, such as AWS, Microsoft Azure, Google Cloud Platform, etc. The rest of the components and subsystems of FIG. 3 are also present in the embodiment of FIG. 5, except that HSM 220 and key database 110 are not explicitly shown to avoid clutter but one or both are presumed to exist. Also, a key database and/or an HSM is presumed to exist with each of KMSes 208A-C.

In order to support the above configuration, console server 112 provides the ability to an admin via its user interfaces 214A-B to add a new KMS or to delete an existing KMS that console server 112 can authenticate to. This is accomplished via either command line options of CLI 214A and/or via appropriate widgets of appropriate screen(s) of GUI 214B. Based on key-metadata stored in the respective KMSes, either of the user interfaces 214A-B of console server 112 provide an overall view or list of encrypted storage resources 202A, 202B1-2, 202C, 224B and 224C for an admin based on the instant design.

Granular roles of admins are defined, preferably via an RBAC model per above, such that different admins may only be able to view and update storage resources associated with a subset of KMSes 208A-C. This is typically the case for environments of very large organizations. Alternatively, more than one console servers may be deployed, each connected to a non-overlapping subset of one or more KMS or KMIP servers, and each KMS/KMIP server responsible for key storage/management for a subset of non-overlapping storage items/resources.

Alternate forms of configuration or implementation shown in FIG. 5 are conceivable. For example, a given environment with multiple KMSes may also have multiple CAs, each associated with a KMS and in charge of managing certificates for storage items/resources, and specifically to their respective hosts, containers, platforms, etc. Similarly, a given environment can have multiple console servers per above. Such a variation easily allows one to segregate a large environment for admins based on non-overlapping console servers communicating with non-overlapping KMSes and their respective storage hosts and resources. For example, admin-1 and admin2 of console server1 communicating with KMS1 and KMS2 may only administer/manage storage resources associated with KMS1-2 via CLI/GUI clients of console server1. Admin3 of console server2 communicating with KMS3 may only administer/manage storage resources associated with KMS3 via CLI/GUI clients of console server2, and so on.

In summary, regardless of the type of a configuration or an environment, an admin has the ability via a CLI or a GUI client of a given console server to add/delete KMSes to/from the console server. Specific CLI commands and GUI widgets/screens for achieving this are easily conceived.

Now let us take advantage of FIG. 6 to understand further capabilities of the present technology. FIG. 6 shows a more complex configuration than the ones described earlier. More specifically, FIG. 6 illustrates a key-metadata based encrypted storage management system 300 of the present design operating on a computer network 316 at a client site 330. System 300 is a secured computer system that has a number of storage resources of any kind operating on-premise or off-premise or in a hybrid manner per earlier discussion.

The respective hosts or nodes of these storage resources are explicitly marked in FIG. 6, however individual storage resources connected to them are not, in order to avoid clutter. FIG. 6 shows a set of storage hosts/nodes 302A1, 302A2, . . . These hosts or nodes may have storage resources of any kind per above discussion, local disks/partitions, SAN/NAS servers, RAID servers, PaaS storage systems, Cloud storages, Hadoop data nodes, specialized or self-encrypting disks/drives, to name a few. Storage resources 302N1, 302N2, . . . are shown to be in the cloud, which may be public, private, or hybrid cloud, that may be on-premise or off-premise. These cloud storage resources are accessible via a cloud storage management host/system 318. Such a cloud storage management system 318 provides the equivalent functionality of local agents 340 explained below, based on the technical architecture and design of the specific cloud storage resource 302N1, 302N2, . . . .

Cryptographic keys 304A1, 304B1, . . . 304N1 along with respective key-metadata 305A1, 305B1, . . . 305N1 for storage resources on respective hosts 302A1, 302B1, . . . 302N1 are stored in a key management system/server or key manager 308A, which is preferably a KMIP server. Similarly, keys 304A2, 304B2, . . . 304N2 along with respective key-metadata 305A2, 305B2, . . . 305N2 for storage resources on hosts 302A2, 302B2, . . . 302N2 are stored in KMS 308B. As shown by the dotted lines, any number and types of such storage resources on any number of hosts/nodes may be present with their cryptographic keys stored in any number of respective KMSes.

In a highly preferred variation, and as noted earlier, it is not the actual encryption or data keys that are stored in KMS, but rather key encryption keys (KEKs) or wrapping keys (WK) for the actual encryption/data keys. In such a variation, the wrapped keys are stored locally on the hosts/nodes in a file system header, or an appropriate storage location. However, the wrapped key can only be unwrapped/decrypted by the WK for the encrypted resource, and the WK resides in the KMS.

FIG. 6 further shows CA 322A per prior explanation in charge of issuing/managing certificates for set of hosts/nodes 302A1, 302B1, . . . 302N1, CA 322B for nodes 302A2, 302B2, . . . 302N2, and so on. Note that in variations of the embodiments shown in FIG. 6, and as shown by the several dotted lines, there may be any number of storage hosts/nodes with any number of storage resources, any number of CAs and KMSes, on-premise or off-premise present. One KMS may store keys for more than one set of nodes 302A1, 302B1, . . . , 302A2, 302B2, . . . , and so on.

Similarly, more than one KMS may be in charge of storing cryptographic keys which may be data keys or corresponding WKs per above teachings for storage resources on hosts/nodes 302A1, 302B1, . . . 302N1, 302A2, 302B2, . . . 302N2, and so on. In a similar manner, the number of CAs may or may not be equal to the number of sets of storage resources or KMSes. There may be just a single CA in charge of certificates for whole of system 300, or one CA may be in charge of certificates for a first set of hosts/nodes, KMS(es) and console server(s) while another CA is in charge of certificates for another set of hosts/nodes, KMS(es) and console server(s), and so on.

FIG. 6 shows two console servers that are driving three user interfaces for three admins shown in FIG. 6. More specifically, console server 306A is serving CLI session or simply CLI 314A1 being used by admin 332 and GUI session or simply GUI 314A2 being used by admin 334 while console server 306B is serving CLI session or simply CLI 314B1 used by admin 336 in metadata based encrypted storage management system 300 of the present technology shown in FIG. 6.

In FIG. 6, there is also an agent 340A1 executing on host/node 302A1, an agent 340A2 executing on node 302A2, and so on. There is further an agent 340B1 executing on host/node 302B1, an agent 340B2 executing on node 302B2, and so on. Similarly, there is an agent 342A executing on CA 322A, an agent 342B executing on CA 322B and so on. Note, that only the first of agents 340A1, 340A2, . . . and agents 340B1, 340B2 and only the first of agents 342A, 342B, . . . is explicitly shown in FIG. 6 to avoid clutter.

The functionality of these agents will become clear by the following explanation. Agents 340A1, 340A2, . . . , 340B1, 340B2, . . . and 342A, 342B, . . . are software agents or programs executing locally on their respective hosts or servers. The communication between console servers 306A-B and local agents 340 is mutually authenticated and protected from snooping or tampering, for example by mTLS explained above. In the preferred embodiment, console servers 306A-B are embodied with a lot more smarts/ intelligence than local agents 340 and which are designed to be simple. This lends for a more scalable architecture that is easily portable across a variety of platforms and hosts/nodes.

In the same or other embodiments, agents 340 are implemented using one or more of available technologies, including REST. As noted above, cloud storage management system/module 318 implements the equivalent functionality of agents 340 to be discussed further below, for specific cloud storage systems 302N used by system 300. This implementation is based on the native architecture and design of the relevant cloud service.

Now let us look further at more of the detailed operational capabilities of system 300 based on the present design.

Key Rotation

One of the operations supported by an instant console server, such as console server 306A via its user interfaces 314A1-A2 is key rotation. As known to skilled artisans, key rotation is the process of retiring the old encryption/data key of an encrypted resource, assigning it a newly generated encryption/data key, decrypting the resource with/by the old key and re-encrypting it with/by the new key. Alternatively, key rotation involves retiring an old WK for a data key, generating a new WK and re-encrypting the data key with the new WK.

Performing key rotation on storage resources of FIG. 6 on scheduled intervals, such as daily, or on demand is important for keeping it secure against attacks/compromises as will be appreciated by skilled artisans. Let us assume that KMS 308A is responsible for storing data keys or WKs for storage resources of hosts/nodes 302A1, 302B1, . . . 302N1. Let us further assume, that CA 322A is responsible for issuing digital certificates for the above hosts and for console server 306A.

Based on a predetermined schedule or on-demand by admin 332 on CLI 314A1 or admin 334 vi GUI 314A2, the task of key rotation for one or more storage resources/items 302 is initiated. Key rotation may be performed on a scheduled basis, such as daily, either completely automatically, or by a yes/no approval by the admin in response to a prompt by the console server 306A. Console server 306A carries out key rotation in conjunction with local agents 340 executing on hosts/nodes 302, exemplarily agent 340B1 on host/node 302B1, per below teachings.

Console server 306A first accesses the old/current WK or alternatively old/current data key for each storage resource/item on host/node 302B1 from KMS 308A, preferably using KMIP protocol. For example, for an encrypted storage resource or partition /dev/sdb1 on host/node 302B1, Console server 306A retrieves the above-discussed key-metadata attributes corresponding to or related to the old/current key for the resource, including Activation date and Key rotation period. As explained, these attributes are stored in the vendor attributes or the custom attributes of KMIP.

Recall, that the storage resource identifier field of key-metadata identifies the storage resource in the system by the appropriate path/label/handle i.e. /dev/sdb1 in our example above. Console server 306A in conjunction with agent 340B1 then performs key rotation per the following steps:

Console Server 306A

1. Compare the current date/time with Activation date field of key-metadata for the old/current key.
2. If the time difference is less than Key rotation period field of key-metadata for the old/current key, then exit.
3. Request KMS 308A to generate a new key.
4. Based on the key-metadata fields for the old/current key as appropriate, set the various key-metadata fields for the new key in KMS 308A.
5. Set the Key state field to Active for the new key in KMS 308A.

Local Agent 340B1

6. Retrieve the old/current key for storage resource /dev/sdb1 from KMS 308A.
7. Retrieve the new key generated in step 3 above for resource /dev/sdb1 from KMS 308A.
8. In the preferred embodiment, where the key generated in KMS 308A in step 3 above is a WK, unwrap the current wrapped data key stored in resource /dev/sdb1 by the old/current WK obtained in step 6 above. Then, wrap the unwrapped data key with the new WK obtained in step 7 above.

Alternatively, if key generated in KMS 308A in step 3 above is a data key, decrypt entire resource or partition /dev/sdb1 by the old/current data key obtained in step 6 above, and re-encrypt it with the new data key obtained in step 7 above.

9. In the preferred embodiment, where the key in KMS 308A is a WK, verify that the new WK can decrypt /dev/sdb1 by first unwrapping the wrapped data key obtained in step 8 above with the new WK, and then reading the header of storage resource /dev/sdb1.
10. If there are no errors in steps 8-9 above, delete the old wrapped data key or alternatively the old data key stored in /dev/sdb1. Otherwise, exit with an error.

Console Server 306A

11. If there are no errors in steps 8-9 above, delete the old key from KMS 308A.

Note, that key deletion above is done by setting the Key state field of the key in the KMS to Revoked or Retired. Once Revoked/Retired, a key cannot ever be re-activated. In various embodiments, more than just steps 6-10 above, or even all of the above steps may be performed by local agent 340B1.

Furthermore, before local agent 340B1 performs step 8 above, it first preferably verifies that the device/resource/partition /dev/sdb1 is indeed encrypted by the instant system. It accomplishes this by verifying an appropriate signature or a value of a metadata field in the header of the encrypted storage resource. If the identified storage resource is encrypted using a different or external cryptographic system, then depending on the embodiment, instant agent re-wraps the external data key with the instant WK, or alternatively replaces the external data key with the instant data key. From now forth, that encrypted storage resource will be encrypted by the instant system.

In still other embodiments, the Key rotation period field is stored in the metadata of the storage resource or partition /dev/sdb1 connected to host/node 302B1, instead of KMS 308A. This metadata is preferably in the device/partition header. In these embodiments, the console server or the agent reads the field from the device header as appropriate.

Throughout the key rotation process console server 306A generates appropriate messages or HTML pages to provide a meaningful and user-friendly experience to admins 332 or 334 on user interfaces 314A1 or 314A2 respectively.

Key Revocation

Console server 306A also provides the appropriate commands and/or widgets/screens in its respective user interface 314A1/314A2 for admins 332/334 for revoking cryptographic keys in conjunction with KMS 308A. Upon instantiation of such a CLI command and/or invocation of equivalent widget/screen by the admin, console server 306A issues the corresponding command to KMS 308A to revoke the key specified in the command. In the preferred embodiment, KMS 308A is a KMIP server and the commands thus issued are based on the KMIP protocol.

Certificate Revocation

In a manner analogous to above, console server 306A also provides the appropriate commands and/or widgets/screens in its respective user interface 314A1/314A2 for revoking certificates in conjunction with CA 322A. More specifically, if there is a compromise of a private key of a certificate of a storage host/node, an admin can use the console server to immediately revoke the corresponding certificate of the host/node. Such a scenario may occur if the storage resource is compromised/attacked, but the admin does not wish to revoke the keys for the data resources of the compromised host/node. This may be the case if those same partitions/disks will be reused on another host/node or the same host/node will be reinstalled with a new certificate and the disks/partitions reused.

In such a scenario, an admin first issues a list subcommand to be explained further below, with --type set to Host. Per below teachings, the subcommand retrieves all hosts visible to the admin with their corresponding certificate serial numbers. The admin then invokes a certificate revocation command/GUI widget/screen of user interface 314A1-2 with the certificate serial number of the compromised host. Console server 306A in turn communicates this serial number to CA 322A, and specifically agent 342A executing on it. Agent 342A then revokes the certificate in CA 322A and adds it to the certificate revocation list (CRL). In other variations where KMS 308A is also the CA, certificate revocation simply involves issuing the appropriate commands to the KMS to revoke the specified certificate and update the CRL per above teachings.

Regardless, the updated CRL is then communicated to all components/subsystems on system 300 so that they would know not to trust that certificate by removing it from their trust stores. This is accomplished by console server 306A sending a command to each agent 340 on nodes 302 as well as any other subsystem on network 316, including the KMSes, to download the latest CRL from CA 322A and update their trust stores.

The console servers log all of the above operations involving storage hosts/nodes, whether on-premise or off-premise/remote, including key rotation, key revocation, certificate revocation. They keep track of which nodes have successfully completed an operation and which have timed out. In the preferred embodiment, they can perform these host operations in parallel. In the same or another preferred embodiment, an admin on a CLI or GUI client of a console server is able to rerun/retry an operation that did not complete successfully the first time.

Profiles and Deployments

Referring still to FIG. 6, based on the instant principles, a profile refers to a collection of settings and credentials for a specific user/admin. A profile is defined per-admin, and is specified by two files, an admin-credentials file and an admin-config file. While issuing commands on a given CLI session or simply CLI 314A1 or 314B1, an admin user instructs the CLI which profile to use by specifying the name of the profile in a flag. If no profile is specified in the command, a "default" profile is used. Therefore, a default profile must always be specified in the above-mentioned profile files i.e. admin-credentials and admin-config files.

While issuing CLI commands, the user may also explicitly specify additional settings for the command that may otherwise be specified in the profile files. For a GUI session however, such as GUI 314A2, the profile is not needed because the desired settings for the session are specified in the URL in conjunction with the HTTP/HTTPs protocol used by the GUI browser. This will be explained further below.

A profile determines which console server or console servers a given CLI client, such as CLIs 314A1 and 314B1 are supposed to establish a connection with. In other words, while console servers 306A and 306B are connected to computer network 316, a profile specifies that CLI client 314A1 can connect to console server 306A, and CLI client 314B1 can connect to console server 306B. Note that depending on the settings specified in an admin's profile, and the authentication credentials of the admin, the CLI and the console server, it is possible for an admin on a given CLI to be able to connect to more than one console servers via different CLI commands.

For the above to happen, the same CLI will need to be mutually authenticated with more than one console servers and the admin will also need to be authenticated on the console servers, per above teachings. It should also be noted that any of KMSes 308A and 308B of FIG. 6 may be implemented as a High Availability (HA) cluster of servers. In such a configuration, if KMS 308A is implemented as an HA cluster, it will still be accessible on network 316 via a single IP address.

A profile also specifies one or more deployment configuration names or deployment names or simply deployments. Each deployment signifies one or more Products of the above discussion, that are managed by the corresponding console server specified in the profile. Thus, the profile for admin 332 may specify that CLI 314A1 can connect to console server 306A. An exemplary deployment specified in admin 332's profile may further indicate that of the various encrypted storage resources managed by console server 306A in conjunction with KMS 308A, some belong to FD/partition Product of the above discussion while others belong to Dkr Product of above discussion—in other words, they are a part of a Docker™ environment.

In the preferred embodiment, the profile is specified by two editable text files by utilizing meaningful markups. Exemplarily, as noted above, these files are called admin-credentials file and admin-config file. Let us now take a concrete example to understand the present design in greater detail by considering admin 332 on CLI 314A1.

First, admin-credentials and admin-config files are specified in the above-mentioned markup text file by specifying the name of the profile in square brackets "[ ]" as a demarking markup. In the preferred implementation, profile "default" must exist by default in these files. An admin can create additional profiles besides [default] profile as needed. The admin-credentials file is preferably readable only by admin 332, but not readable/writeable by any other admins on network 316. The present scheme thus allows extremely restrictive permissions on admin-credentials file but not necessarily on admin-config file, which may be less restricted.

Following are exemplary admin-credentials and admin-config files for admin user 332 operating on CLI session or simply CLI 314A1.

Lines starting with a "#" are meant for comments.

Admin-Credentials File

[default]
for password authentication:
userid=admin332
password=Xr89MKJ56
for cert authentication:
certpassword=pM2iegSZwu8
Admin-config file:
[default]
Consoleserver=console306A.mydomain.com (or an IP address)
CAcert=/usr/lib/security/CA/CAcert.pem
for cert auth:
CertForConsoleServer=/usr/lib/security/CLI/
 certForCS306A.pem
Key=/usr/lib/security/CLI/key.pem In the above specification, .pem file extension signifies a privacy-enhanced mail (PEM) file format known in the art of cryptography for storing/communicating certificates, keys, CSRs, and other data.

Before explaining individual entries of the settings specified in the above profile, let us first recall from above that there is a console client certificate that allows console server 306A to authenticate itself as a client to KMS 308A. There is also a console server certificate for authenticating console server 308A to its clients 314. These console client certificate and console server certificate are stored on console server 306A itself, in file(s) or a database, and therefore do not preferably need to be specified in the profile files presented above.

Now let us review the above admin-credentials and admin-config files in great detail. Based on the default profile specified under the [default] markup in the above admin-credentials and admin-config files, admin 332 can log into the console server specified in the Consoleserver field of admin-config file, using the userid and password fields specified in the admin-credentials file. The password specified above is stored on the client side, specifically where CLI 314A1 is executing. It is stored in cleartext and sent to the console server where its hash is checked for authentication.

As a result of the above scheme, when admin 332 issues a CLI command on CLI 314A1, his/her userid/password are sent to console server 306A as a part of the request. Note that because of mTLS connection between CLI 314A1 and console server 306A per above, the request along with the userid/password are encrypted. When console server 306A receives the request, it performs a salted hash of preferably length 24 or more bytes before hash computation. The hash or ciphering algorithm is preferably pbkdf2-sha512 with preferably 10,000 or more iterations. Alternatively, the hashing algorithm is bcrypt with preferably 2000 or more iterations. It then compares the resulting hash to the hash stored locally on the console server (in files/database). If the hashes match, the authentication is successful, otherwise the request is rejected.

Instead of or in addition to userid/password, admin 332 can also log into console server 306A using a digital certificate issued by CA 322A to admin 332. Such a digital certificate is specified by the field CertForConsoleServer above. The private key of this certificate is specified by the Key field above. Note that the above credentials are in addition to any credentials that admin user 332 needs to log into computer network 316 of key-metadata based encrypted resource management system 300. All the above credentials, including the network credentials for admins 332, 334 and 336 are preferably stored in LDAP 324 shown in FIG. 6.

The admin-credentials file also specifies the field certpassword which is used to encrypt the Key file given by the field Key in the profile specified above. As a result, the private key of the certificate of admin 332 specified by CertForConsoleServer field is not stored in the filesystem/storage in plaintext but rather in ciphertext. certpassword field is only relevant for authentication of the clients to console server by using digital certificates. The field CAcert in admin-config file above is used to specify the location of root certificates of the CAs on network 316, such as CA 322A. This field is the equivalent of a trusted store of a web browser where the public key of the CA is stored, and is used by the CLI to verify the authenticity of the digital certificate(s) presented to it by the console server.

In variations of above embodiments, both the admin-config and admin-credentials files may be editable manually and/or by CLI commands and arguments. As already noted above, the GUI client, such as GUI 314A2 do not use a profile. This is because all the corresponding settings specified in the profile are instead either specified in the URL used for connecting to console server 306A, or they are incorporated in the HTTP authentication mechanism.

More specifically, a username/password, such as for admin 334 of GUI 314A2 of FIG. 6, is communicated by a browser to the server using HTTP/HTTPS authentication/authorization protocol known in the art. The username/password may also be stored in the password manager of the web browser. In as far as authenticating admin 334 using a digital certificate is concerned, it is done based on TLS or mTLS based authentication scheme of HTTPS per prior teachings.

In such an implementation, the client certificate of admin 334 may be managed by the browser. The private key may be encrypted by the browser using a master password, or stored securely in a keychain.

Main CLI Commands

In an exemplary implementation, following are the main commands that an admin such as admin 332 and/or admin 336 can execute on respective CLI clients 314A1 and 314B1. It should be noted, that these commands can also be executed equivalently by utilizing appropriate GUI widgets and/or GUI screens known in the art via GUI client 314A2. Let us continue with our above example of CLI/GUI 314A1/314A2 clients of console server 306A working with KMS 308 and hosts/nodes 302A1, 302B1, . . . 302N1, and CA 322A.

Console server 306A is used from an authenticated CLI client using the exemplary "admin" command and its respective command line arguments. Here the first "$" signifies a CLI interface or shell prompt:

$ admin [common arguments]<subcommand>[subcommand-arguments]

[Common Arguments]: Common Arguments For All Commands

--profile <profile name> for using the profile named in angled brackets that is other than "default" profile discussed above. The selected profile will be used for the remainder of the command.
--deployment <deployment name> for selecting the deployment named in angled brackets for the remainder of the command.
--verbose N for specifying the verbosity of messages displayed during the execution of the command. Exemplarily, N=1 means least verbose and N=X means more verbose, where X>1.
--debug for displaying debug messages that are more technical than above and are meant for developer or quality assurance (QA) audience.
--set-profile for selecting the profile named after --profile argument above for any subsequent commands.
--set-deployment for selecting the deployment named after --deployment argument above for any subsequent commands.
--show-profile for displaying the profile name currently selected with --set-profile argument above.
--show-deployment for displaying the deployment name currently selected with --set-deployment argument above.

List Subcommand

The list subcommand is used at CLI client 314A1 (or its equivalent widget/screen at GUI client 314A2) for displaying encrypted storage resources in the system that are managed by console server 306A, based on the specified criteria and filters.

Exemplarily, the list subcommand is specified by the following format:
admin [common arguments] list [--type <type>] [--filter <pattern>]

In the above, --type argument can be one of the following keywords/literals: Product, Host, Key, License, Certificate, User, Deployment. <pattern> is used to specify a regular expression for matching multiple encrypted resources returned by the list subcommand. These values for --type argument are explained below:

Product: List/display encrypted storage resources by Product. Recall from the discussion of Product attribute of key-metadata above that, a product type or simply a product identifies the type and or manner of use of an encrypted resource, and is exemplarily one of the following:
FD/partition: An encrypted disk/partition that may be local to a host or it may be provisioned on a host of a PaaS environment, including Cloud Foundry™ and the like, which in in turn may have been installed with BOSH™ project.

Dkr: An encrypted storage volume assigned to a Docker™ container.
Knt: An encrypted storage volume assigned to a Kubernetes™ container.
Opns: An encrypted storage volume assigned to an Opentshift™ container.
EC2: An encrypted amazon web services (AWS) elastic cloud computing (EC2) object.
GCP: An encrypted block storage object in Google™ cloud platform (GCP).
Host: List/display encrypted storage resources by host.
Key: List/display encrypted storage resources by data keys or WKs.
License: List/display encrypted storage resources by a license identifier identifying the present instance of key-metadata based encrypted storage system 300 for a given customer/client at site 330.
Certificate: List/display encrypted storage resources by digital certificates.
User: List/display encrypted storage resources by userids.
Deployment: List/display encrypted storage resources by deployment names.

In the absence of a filter argument, all encrypted resources matching the type argument above are listed.

Exemplary Outputs of List Subcommand

In the absence of the type and filter arguments per above, the output of the list command produces a Full output containing fields for all values of --type argument specified above.

If the --type argument is specified however, the output is restricted accordingly. Below is the output of the list subcommand in the tabular format of Table 1 when the value for --type argument is Key:
$ admin list --type Key:

TABLE 1

| KeyID | Product | Deployment | Host | ObjectID | Activation Date | Expiration Date | Key State |
|---|---|---|---|---|---|---|---|
| aakshjks | FD/partition | Company_1 | Database01 | /data/disk1 | Sep. 24, 2020 | Mar. 24, 2021 | A |
| sdfkjhsk | FD/partition | Company_1 | Database01 | /data/disk2 | Sep. 24, 2020 | Dec. 24, 2020 | A |
| oiweoien | Dkr | Company_2 | Con1.dom1.com | dkrVol1 | Sep. 24, 2020 | Mar. 24, 2021 | A |
| ... | ... | ... | ... | ... | ... | ... | ... |

In the example above, KeyID is the unique identifier assigned by KMS 306A of our above example, to each key that has been generated by it. In the KMIP vernacular, it is sometimes referred to as the KMIP object ID. It may be a Globally Unique Identifier (GUID). Product, Deployment, Host, ObjectID, Activation Date, Expiration Date and Key State columns are the respective key-metadata fields of Product, Deployment Name, Hostname, Storage resource identifier, Activation date, Expiration date and Key state respectively per earlier explanation. Key State of A means that the key is in Active state.

The equivalent screenshot from a GUI session of a GUI client 314A2, or simply GUI 314A2 of a specific implementation of the present technology is shown in a left-hand-side portion 402 and a right-hand-side portion 404 in FIG. 7A and FIG. 7B respectively.

Similarly, below are outputs of other variations of the list subcommand based on above specification:

$ admin list --type Host:

TABLE 2

| Product | Deployment | Host | Certificate # |
|---|---|---|---|
| FD/partition | Company_1 | Database01 | ABD274990 |
| FD/partition | Company_1 | Database01 | ABD274990 |
| Dkr | Company_2 | Con1.dom1.com | 43834ABCF |
| ... | ... | ... | |

If a host is compromised, an admin is able to use the above command at the CLI or equivalently at the GUI to retrieve the certificate serial number of the compromised host, and then have the certificate revoked by CA per above explanation.

The almost equivalent screenshot 406 from GUI 314A2 of a specific implementation is shown in FIG. 8.

$ admin list --type Product:

TABLE 3

| Product | Deployment |
|---|---|
| FD/partition | Company_1 |
| FD/partition | Company_1 |
| Dkr | Company_2 |
| ... | ... |

The almost equivalent screenshot 408 from GUI 314A2 of a specific implementation is shown FIG. 9, where the Product and Deployment columns are reversed in order.

$ admin list --type License:

TABLE 4

| Product | Deployment | Host | License id | License State | Details |
|---|---|---|---|---|---|
| FD/partition | Company_1 | Database01 | X123 | Valid | ... |
| FD/partition | Company_1 | Database01 | X123 | Valid | ... |
| Dkr | Company_2 | Con1.dom1.com | Y123 | Expired | ... |
| ... | ... | ... | ... | ... | ... |

In the above, License id is on a per-Product basis. The output contains at least one line for each license id. Since there may be more than one deployment per license, as such, there may be multiple lines with the same license id. Note that License State of license id Y123 is Expired, though it may continue to be operational. This way the client/customer in question may be contacted to renew their license without disrupting the operation of their system. Conversely, the client/customer may contact the instant system provider to renew their license, if their license has expired or is about to.

Potential values for License State column are exemplarily, Valid, Expired, Not yet valid, etc. The Detail columns may specify any meaningful notes about the License as typically gathered from a License server discussed further below. For example, the Detail column may show what configuration the license is applicable for, for example, number of storage hosts/nodes, number of processor cores, etc.

State Subcommand

Recall from above that the format for an admin command in an exemplary implementation is given by:
 # admin [common arguments]<subcommand>[subcommand-arguments]

By now, we have covered the list subcommand of the admin command in detail. Now let us study state subcommand of the admin command.

The state subcommand allows changing the state of the specified cryptographic key, digital certificate, or all keys and/or certificates belonging to a specified host/node.

More specifically, the following specifies the format of the state subcommand.

$ admin [common arguments] state <--key keyID|host host|--cert certificate serial number> <revoke|destroy>[--compromised]

Per above, the state subcommand takes two mandatory arguments, one for that identifying the object, such as a key or certificate, and the other for specifying its new state. The revoke argument has an optional --compromised flag that sets the revocation reason for the key in the KMS to Compromised.

At the operational level, when instantiated, the above state subcommand instructs the console server, such as console server 306A while continuing with our above example, to contact KMS 308A and issue the appropriate KMS command to KMS 308A for performing the requested task. In the preferred embodiment, KMS 308A is a KMIP server, and thus the commands issued by console server 306A are based on the KMIP protocol.

Let us consider the following exemplary state subcommands and their outputs:

$ admin state revoke -compromised --key sdfkjhsk

Once instantiated, the above command instructs console server 306A to request KMS 308A to revoke key specified by keyID sdfkjhsk. The output of the KMS for the execution of the request, whether successful or in error, is then displayed on the output of clients 314A1 or 314A2 in a meaningful and user-friendly manner.

Exemplarily, the output of the above state subcommand produces the following output while continuing with our above example:

TABLE 5

| Console server | Object State | Object ID | Host |
|---|---|---|---|
| console306A.mydomain.com | Revoked Compromised | sdfkjhsk | Database01 |

The console server above specifies the name of the console server in question. Object State specifies the current state of the object. The Object ID column specifies the object itself, such as via a key ID for a key or a certificate serial number for a digital certificate per above. The Host column specifies the host/node to which the object is associated or connected.

In a similar manner. Let us see consider another exemplary state subcommand.

$ admin state revoke --host Database01

Revoking a host entails revoking all objects, including keys and certificates, that are associated with or belong to the specified host. In order to accomplish this, while continuing with our above example, console server 306A first queries KMS 308A for the key-metadata for all keys belonging to the specified host. The key-metadata also contains the certificate serial number of the host being revoked.

Thus, in one variation, console server 306A issues revoke commands to KMS 308A for each key thus obtained. Subsequently or in parallel console server 306A requests CA 322A to revoke the certificate of the host obtained above. For this purpose, local agent 342A on CA 322A is utilized to service the revocation request. In this manner, all keys associated with that host are revoked by the KMS and the digital certificate belonging to the host is revoked by the CA.

In variations where KMS 308A is also the CA, console server 306A just issues key revocation and certificate revocation commands with the keys and certificate obtained per above. In this manner, all keys and the certificate belonging to or associated with that host are revoked by the KMS. In still other variations where key-metadata above does not provide the certificate serial number associated with the host, console server 306A queries CA 322A for the certificate serial number associated with or belonging to the specified host. For this purpose, local agent 342A on CA 322 is utilized to service the above query from console server 306A. Once it receives the certificate serial number above, the console server instructs the CA to revoke the certificate, while again utilizing local agent 342A as needed.

The output from the above state subcommand is exemplarily given by Table 5 above with each row specifying the object, whether key or certificate, its corresponding (new) state, and the host specified in the original state subcommand. As many rows of Table 5 as the number of revoked objects is printed in the output. As before, the output is provided to the client and admin initiating the state subcommand/request whether on CLI or the GUI, i.e., to CLI 314A1 for admin 332 or equivalently on GUI 314A2 to admin 336.

Admin Subcommand

The admin subcommand of the admin command specified above provides admin 332 of CLI 314A1 of our above example, and equivalently admin 334 of GUI 314A2, to perform various administrative functions on console server 306A. The admin subcommand with its various subcommand arguments is specified by the following:

admin [common arguments] admin [adduser|deluser|password permission] -user <user> [--readonly] [--password <password>] [---permission <XXX>]

In the above, the -user argument specifies the admin user of the instant system and not an end-user. The adduser/deluser arguments of the admin subcommand allow a root admin to add/delete another standard admin. The --readonly flag indicates that the admin user specified in the command needs to be set to read-only. The --password argument allows the root admin to set the password for the specified standard admin. The --permission argument allows a root admin to explicitly set the permissions for the user.

The reader is referred to the Roles and Authorizations sections above for understanding the distinctions between a root, standard/regular and read-only admins based on the instant principles. Thusly, a read-only admin can only execute list subcommand on CLI 314A1 or equivalently on GUI 314A2, but not the state and admin subcommands.

FIG. 10 shows a screenshot 410 from GUI 314A2 of an exemplary implementation of the present technology showing the various userids/Logins and their roles or authorization levels. Specifically, screenshot 410 shows a root admin userid of "system", two standard/regular admin userids "System1" and "System3" and two read-only admin userids "System2" and "System4".

Logging

In the preferred embodiment, the console servers as well as its CLI and GUI clients log all operations in a format that is readable by log monitoring tools available in the art. Importantly, all authentication activities involving the console server and its clients are logged. Similarly, all requests and activities involving a change in the state of an object or a change of permissions per above teachings is logged. Thus, all requests to add/delete admins or to change their rights/permissions are logged. A preferred embodiment utilizes Log4J utility. The same or another embodiment supports the syslog standard known in the art.

Licensing

In the preferred embodiment, an admin on a CLI or a GUI client of console server is able to see what their current license at the given client site allows, its license state per above, usage thus far, and any other meaningful metrics. These include which Products the license is valid for, how many cores, etc. For this purpose, a license server is deployed on client site that is preferably accessed and which is in charge of maintaining a license database containing relevant details and metrics of the license issued to the customer of the present system. An admin is able to thus query the license server for the required licensing information via typed commands on the CLI client or equivalently by an appropriate widget of a GUI screen of the GUI client of the console server based on above teachings.

Installation

The present technology can be flexibly installed at a given customer site according to the needs of a given implementation. For example, at sites employing a container management system, the console server and its clients are preferably delivered in a container of the same type as the container management system. Otherwise, the console server and its clients may also be installed natively on appropriate servers/infrastructure deployed at the given client site.

For completeness, FIG. 11 shows a screenshot 412 from a GUI 314A2 of console server 306A from an exemplary implementation of the present technology that employs multiple KMSes as shown in the embodiments of FIG. 6. Such a screenshot may be the equivalent of an output of a "$admin list --type KMS" subcommand per above teachings. Specifically screenshot 412 shows various KMSes, their respective IP addresses and respective port numbers that console server 306A uses to connect to them.

Screenshot 412 further shows in column "CAFile Path", paths to the respective CA certificate files that console server 306A uses to verify the authenticity of digital certificates issued by the CA to resources and modules/subsystems associated with respective KMSes. It also shows in column "Keystore Path", paths to the respective keystores where the digital certificates and private keys of console server 306A are located for authenticating it as client to the respective KMSes. More specifically, path/new holds the file, exemparily a .jks file, that contains as objects, the digital certificate and the private key of console server 306A for authenticating to KMIP222.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A system comprising at least one non-transitory storage medium storing computer-readable instructions and at least one microprocessor coupled to said at least one non-transitory storage medium for executing said computer-readable instructions, said system further comprising:
   (a) a key management server for storing one or more cryptographic keys and one or more key-metadata attributes related to each of said one or more cryptographic keys; and
   (b) a console server with a user interface for the management of said one or more cryptographic keys and corresponding one or more encrypted storage resources, said management based on said one or more key-metadata attributes, said console server in authenticated communication with said key management server;
   wherein said each of said one or more cryptographic keys is one of a data key for decrypting one of said corresponding encrypted storage resources and a wrapping key for decrypting said data key, and wherein said one or more key-metadata attributes associate said one or more cryptographic keys to said corresponding one or more encrypted storage resources.

2. The system of claim 1 wherein said key management server supports key management interoperability protocol (KMIP).

3. The system of claim 1 wherein said user interface comprises one or both of a command line interface and a graphical user interface.

4. The system of claim 1 wherein an administrator using said user interface performs one or more of a key rotation, a key revocation, a certificate revocation, a list subcommand, a state subcommand and an admin subcommand.

5. The system of claim 1 wherein said corresponding one or more encrypted storage resources comprise an on-premise storage and a cloud storage.

6. The system of claim 5 wherein said on-premise storage is one or both of:
   (a) a storage disk connected to a host; and
   (b) a storage volume assigned to a container of a container management system.

7. The system of claim 6 wherein said host is provisioned in a platform-as-a-service (PaaS) environment.

8. The system of claim 1 wherein said authenticated communication is established via a mutual transport layer security (mTLS) protocol.

9. The system of claim 8 wherein a certificate authority (CA) is used to issue digital certificates for said mTLS protocol.

10. A computer-implemented method executing by at least one microprocessor, computer-readable instructions stored in a non-transitory storage medium coupled to said at least one microprocessor, said method comprising the steps of:
    (a) executing a key management system for storing one or more cryptographic keys and one or more key-metadata attributes related to each of said one or more cryptographic keys;
    (b) executing a console server with a user interface for managing said one or more cryptographic keys and corresponding one or more encrypted storage resources, said managing based on said one or more key-metadata attributes, and said key-metadata attributes associating said one or more cryptographic keys to said corresponding one or more encrypted storage resources; and
    (c) providing said each of said one or more cryptographic keys to be one of a data key for decrypting an encrypted storage resource amongst said corresponding one or more encrypted storage resources and a wrapping key for decrypting said data key.

11. The method of claim 10 providing said key management system to support key management interoperability protocol (KMIP).

12. The method of claim 10 providing said user interface to be one or both of a command line interface and a graphical user interface.

13. The method of claim 11 enabling an administrator using said user interface to perform one or more of a key rotation, a key revocation, a certificate revocation, a list subcommand, a state subcommand and an admin subcommand.

14. The method of claim 13 displaying at least one of said one or more key-metadata attributes and at least one of said corresponding one or more encrypted storage resources in response to said list subcommand.

15. The method of claim 10 providing said one or more encrypted storage resources to be one or both of an on-premise storage and a cloud storage.

16. The method of claim 15 providing said on-premise storage to be one or both of:
    (a) a storage disk connected to a host; and
    (b) a storage volume assigned to a container of a container management system.

17. The method of claim 10 utilizing mutual transport layer security (mTLS) for mutually authenticating said console server and said key management system.

18. The method of claim 10 providing a userid/password based scheme for authenticating said user interface to said console server.

* * * * *